US012210926B2

(12) United States Patent
Tan

(10) Patent No.: US 12,210,926 B2
(45) Date of Patent: Jan. 28, 2025

(54) DUPLEX CARD SCANNER

(71) Applicant: Hin Leong Tan, Sunnyvale, CA (US)

(72) Inventor: Hin Leong Tan, Sunnyvale, CA (US)

(*) Notice: Subject to any disclaimer, the term of this patent is extended or adjusted under 35 U.S.C. 154(b) by 421 days.

(21) Appl. No.: 17/743,027

(22) Filed: May 12, 2022

(65) Prior Publication Data
US 2023/0367980 A1 Nov. 16, 2023

(51) Int. Cl.
G06K 7/10 (2006.01)
G06K 7/00 (2006.01)

(52) U.S. Cl.
CPC ....... G06K 7/0069 (2013.01); G06K 7/10742 (2013.01); G06K 7/10831 (2013.01)

(58) Field of Classification Search
CPC ............ G06K 7/10821; G06K 7/10831; G07F 7/0873
See application file for complete search history.

(56) References Cited

U.S. PATENT DOCUMENTS

| 5,642,160 | A | * | 6/1997 | Bennett | H04N 7/181 |
| | | | | | 348/E7.086 |
| 11,068,677 | B1 | * | 7/2021 | Tan | G06V 30/40 |
| 2006/0072822 | A1 | * | 4/2006 | Hatzav | G03B 15/00 |
| | | | | | 382/181 |
| 2019/0130147 | A1 | * | 5/2019 | Ikeda | H04N 1/00551 |

* cited by examiner

Primary Examiner — Thien M Le
Assistant Examiner — April A Taylor
(74) Attorney, Agent, or Firm — Douglas L. Weller

(57) ABSTRACT

A card scanner has a card support mechanism for receiving a card and a camera system. A first mirror is mounted so that a first image of a first side of the card reflects to the camera system when the card is within the card support mechanism. A second mirror mounted is so that a second image of a second side of the card reflects to the mechanism camera when the card is within the card support mechanism. Once the card is within the scanner, the camera system captures the first image of the first side of the card and the second image of the second side of the card.

17 Claims, 22 Drawing Sheets

DUPLEX CARD SCANNER

BACKGROUND

Card scanners are used to efficiently scan in data from cards such as business cards, driver's licenses, insurance identification cards and other forms of identification cards. The scanners can be simplex card scanners or duplex card scanners. Examples of current card scanners are the BCR901 Simplex Card Scanner and the DX1210 Duplex Card Scanner both currently available from Card Reader Inc, on the website www.bizcardreader.com

DETAILED DESCRIPTION OF SOME EMBODIMENTS

Figure 1:
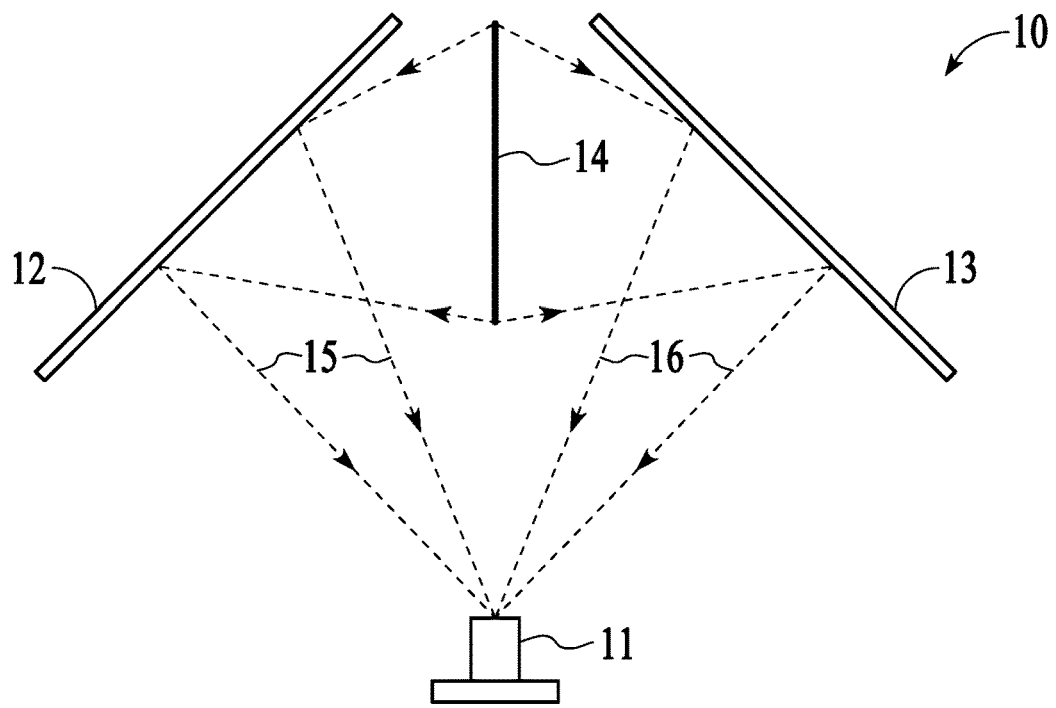
FIG. 1 is a simplified top view of a duplex card scanner that uses a single camera.

FIG. 1 is a simplified top view of a duplex card scanner 10 that uses a single camera 11. A card 14 is positioned between a mirror 12 and a mirror 13 oriented as shown. Camera 11 captures an image that includes both sides of card 14, as illustrated by dashed lines 15 that represent an image capture of a first side of card 14 reflected from mirror 12 and by dashed lines 16 that represent an image capture of a second side of card 14 reflected from mirror 13. The shown implementation of duplex card scanner 10 facilitates simultaneous image capture of both sides of card 14. For example, mirror 12 and mirror 13 are each front surface mirrors. For example, camera 11 is high resolution camera that captures at least eight million pixels allowing image capture resolution of at least 300 dots per inch (dpi).

Figure 2:
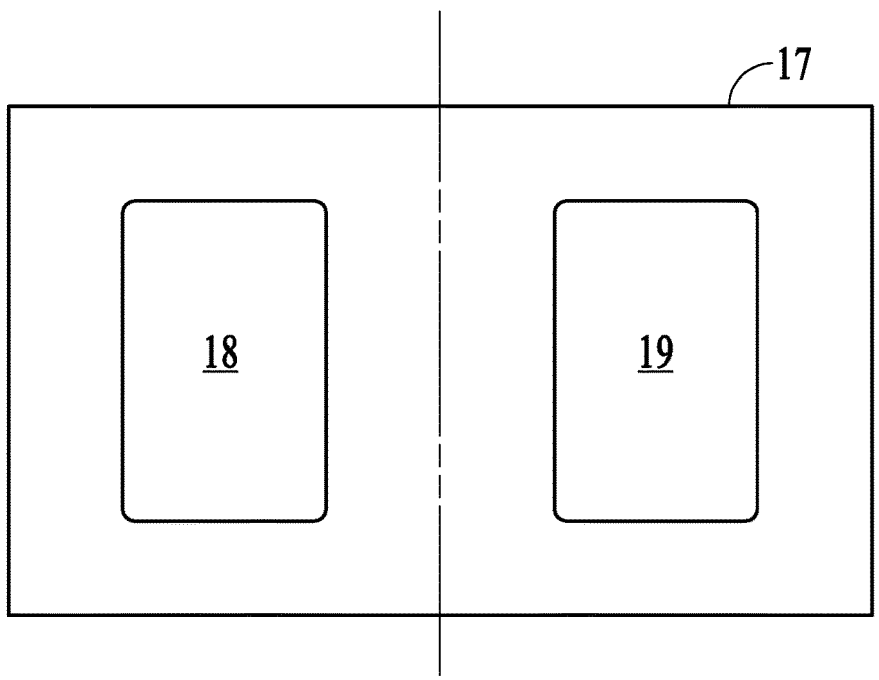
FIG. 2 illustrates card images captured in portrait orientation by the duplex card scanner shown in FIG. 1.

FIG. 2 shows an image 17 captured by single camera 11 that includes an image capture 18 of the first side of card 14 and an image capture 19 of the second side of card 14 when card 14 is in a portrait orientation. Image 17 is cropped as required for processing of imaged captures from each side of card 14.

Figure 3:
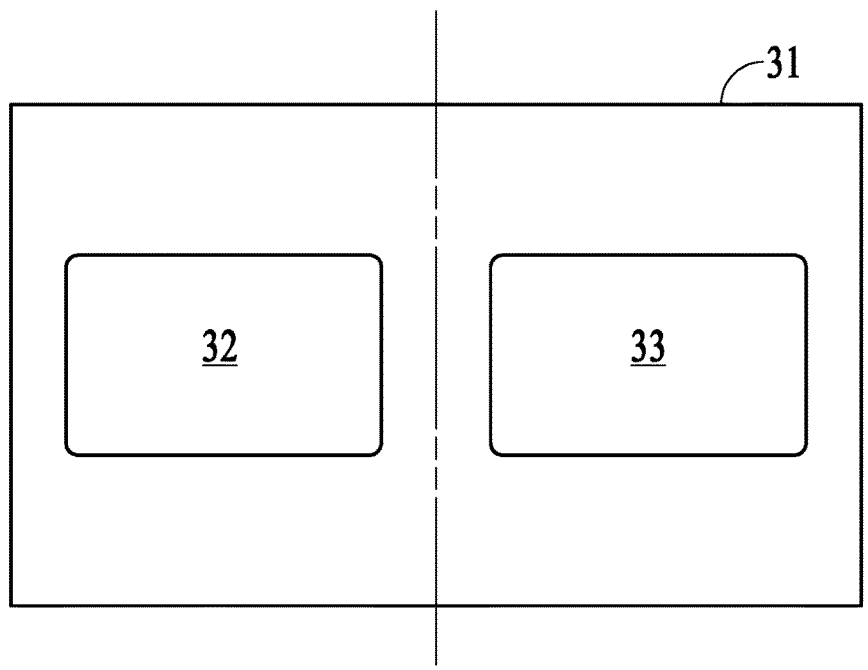
FIG. 3 illustrates card images captured in landscape orientation by the duplex card scanner shown in FIG. 1.

FIG. 3 shows an image 31 captured by single camera 11 that includes an image capture 32 of the first side of card 14 and an image capture 33 of the second side of card 14 when card 14 is in a horizontal orientation. Image 31 is cropped as required for processing of imaged captures from each side of card 14.

Figure 4:
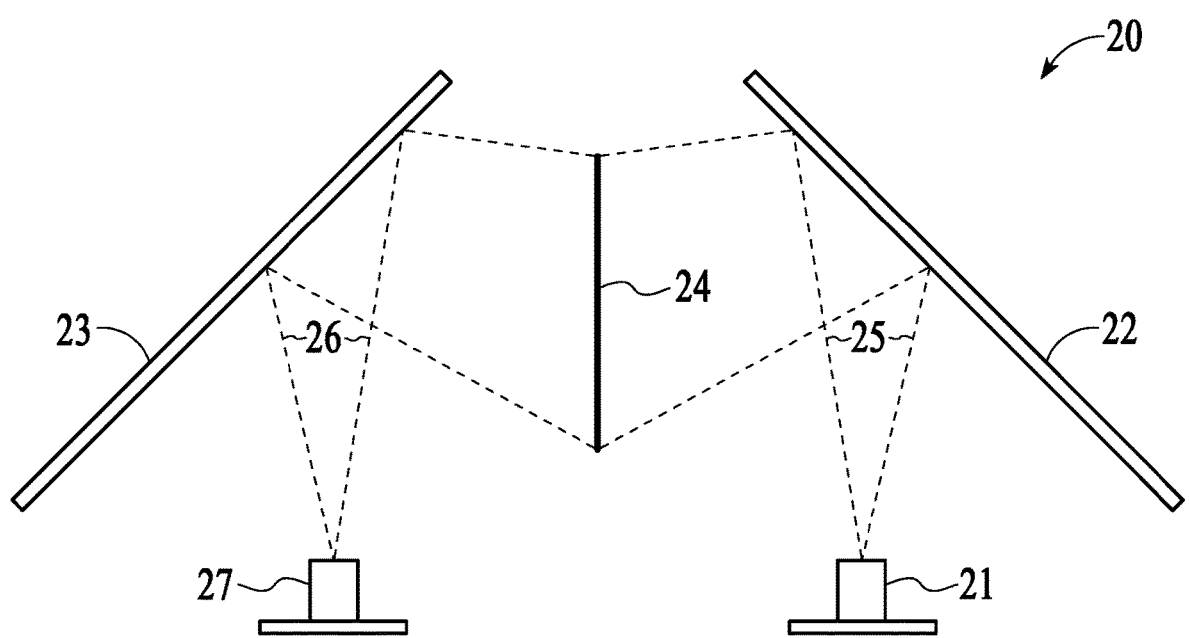
FIG. 4 is a simplified top view of a duplex card scanner that uses two cameras.

FIG. 4 is a simplified top view of a duplex card scanner 20 that uses a camera 21 and a camera 27. A card 24 is positioned between a mirror 22 and a mirror 23 oriented as shown. Camera 21 captures an image that includes a first side of card 24, as illustrated by dashed lines 25 that represent an image capture of a first side of card 24 reflected from mirror 22. Camera 27 captures an image that includes a second side of card 24 as illustrated by dashed lines 26 that represent an image capture of a second side of card 24 reflected from mirror 23. The shown implementation of duplex card scanner 20 facilitates simultaneous image capture of both sides of card 24 using two cameras. For example, camera 21 and camera 27 are high resolution cameras that capture at least five million pixels allowing image capture resolution of at least 300 dpi for image capture of each side.

Figure 5:
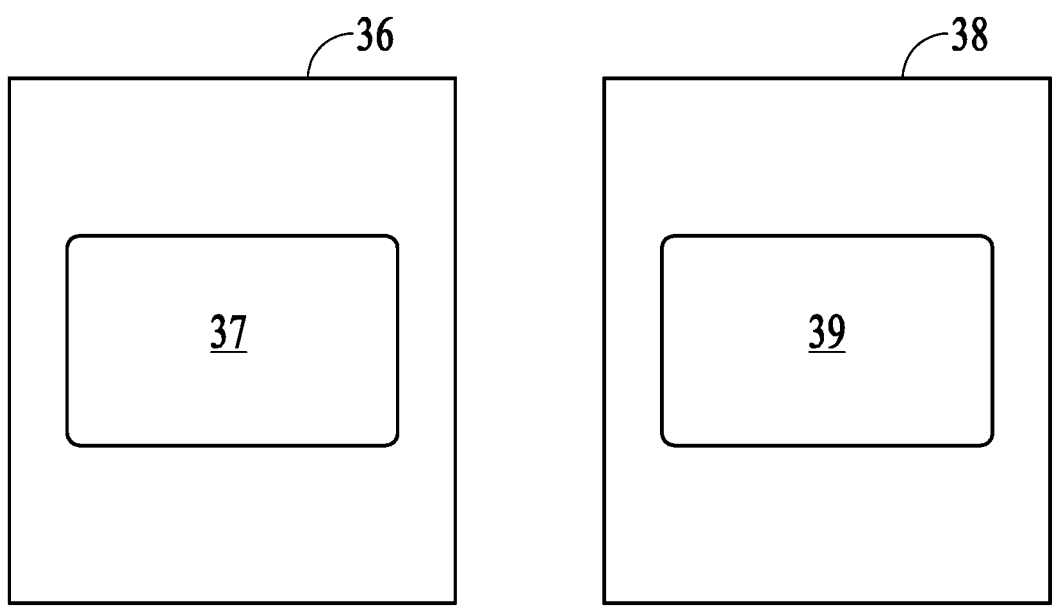
FIG. 5 illustrates card images captured by the duplex card scanner shown in FIG. 4.

FIG. 5 shows an image 36 captured by camera 21 that includes an image capture 37 of the first side of card 24. FIG. 5 also shows an image 38 captured by camera 21 that includes an image capture 39 of the second side of card 24.

Image 37 and image 38 are cropped as required for processing of imaged captures from each side of card 14.

Figure 6:
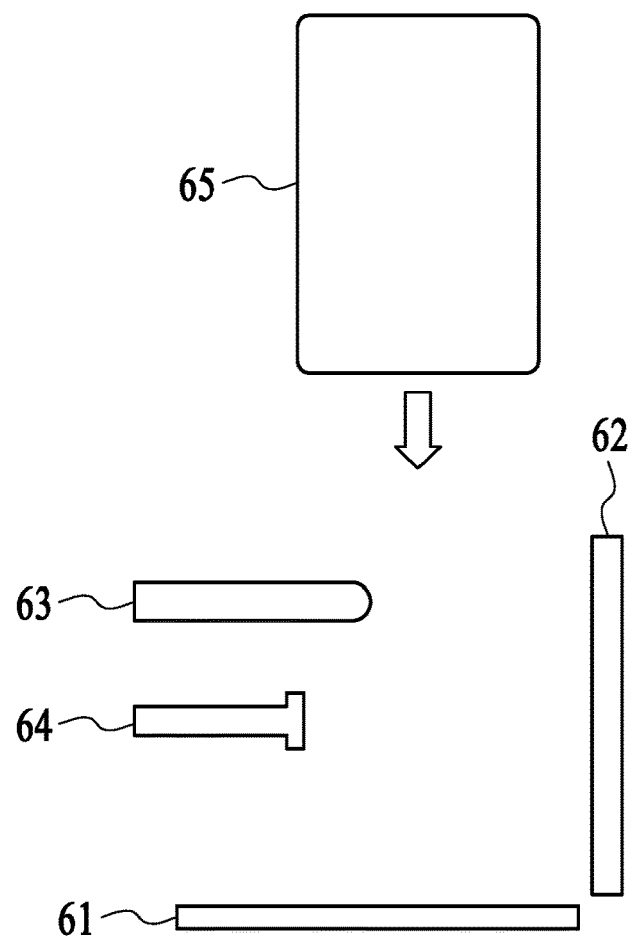
FIG. 6 illustrates operation of a card support mechanism of a duplex card scanner.

FIG. 6 illustrates operation of a card support mechanism of a duplex card scanner. A card guide 63 helps position a card 65 that enters a card scanner. The card after entry rests on a card base 61. A card clamp 64 positions card 65 against a card stop 62. For example card base 61 and/or card stop 62 can be part of the housing of the duplex card scanner.

Figure 7:
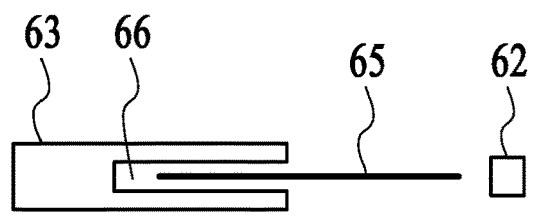
FIG. 7 shows a top view of a card guide and card stop shown in FIG. 6.

FIG. 7 shows a top view of card guide 63 and card stop 62. A slot 66 in card guide 63 helps position card 65 as card 65 enters the duplex card scanner.

Figure 8:
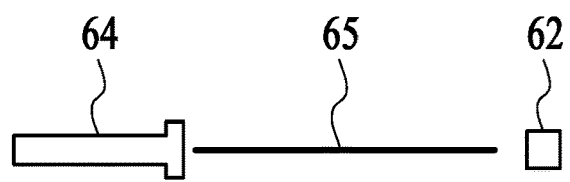
FIG. 8 shows a top view of a card clamp and a card stop shown in FIG. 6.

FIG. 8 shows a top view of card clamp 64 and card stop 62. After card 65 enters the duplex card scanner and rests on card base 61, card clamp 64 positions card 65 against card stop 62

Figure 9:
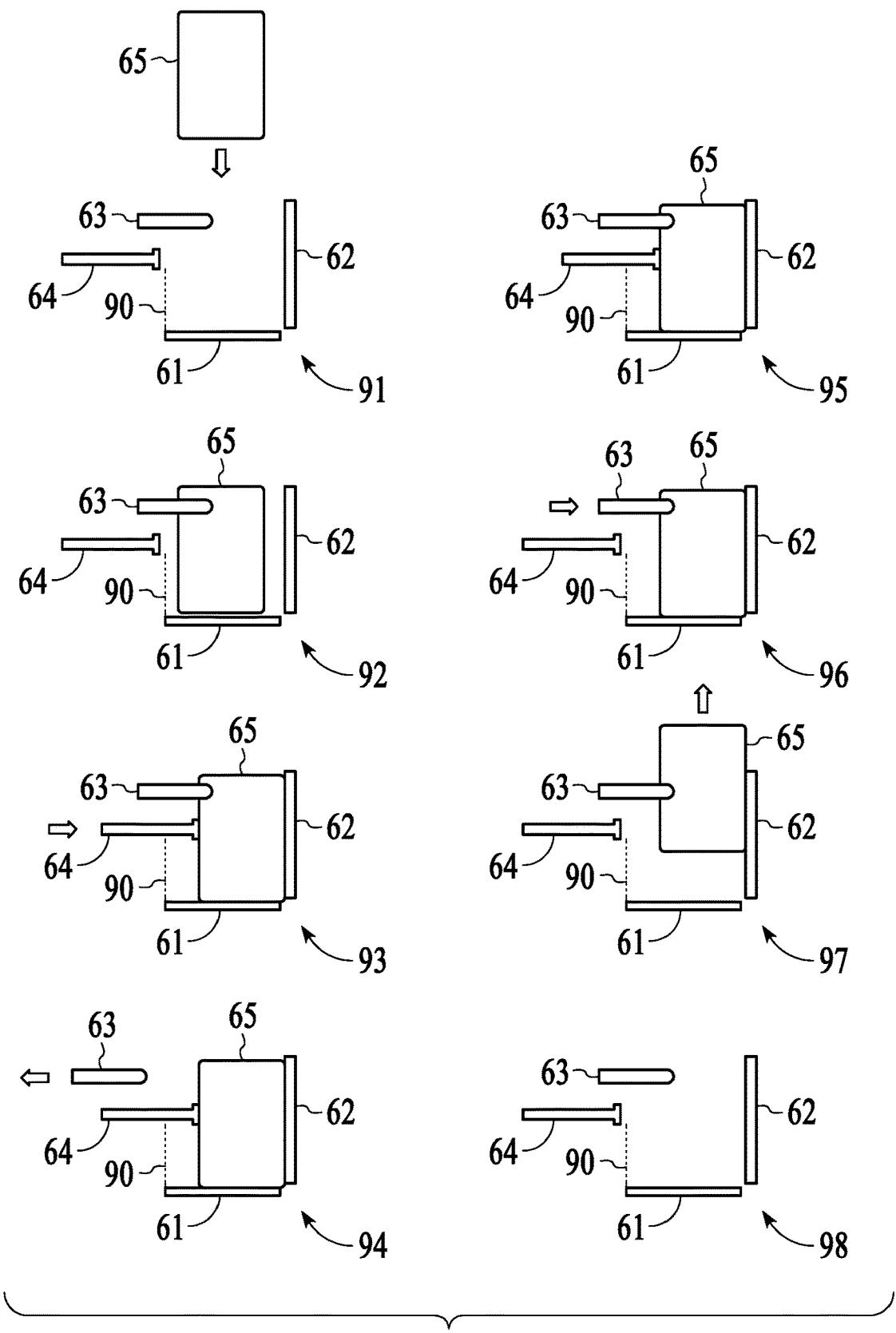
FIG. 9 shows seven stages that illustrate operation of the card support mechanism illustrated in FIG. 6.

FIG. 9 shows seven stages that illustrate operation of the card support mechanism illustrated in FIG. 6. In a stage 91, card 65 is positioned to enter the duplex card scanner. A reference line 90 is shown to provide a reverence for movement of positions card guide 63 and card clamp 64. In a stage 92, card 65 has entered the duplex card scanner and rests on card base 61 and is held within slot 66 of card guide 63.

In a stage 93, card clamp 64 has positioned card 65 against card stop 62. In a stage 94, card guide 63 moves away from card 65 so that an unobstructed image can be made of both sides of card 65.

After an unobstructed image can be made of both sides of card 65, stage 95 shows card guide 63 moved back in position so that card guide 63 is positioned for removal of card 65 from the duplex card scanner. Stage 96 show card clamp 64 withdrawn from card 65 to facilitate removal of card 65 from the duplex card scanner.

Stage 97 shows card 65 in the process of being removed from the duplex card scanner. Stage 98 shows the duplex card scanner empty and ready for a new card to be entered.

Figure 10:
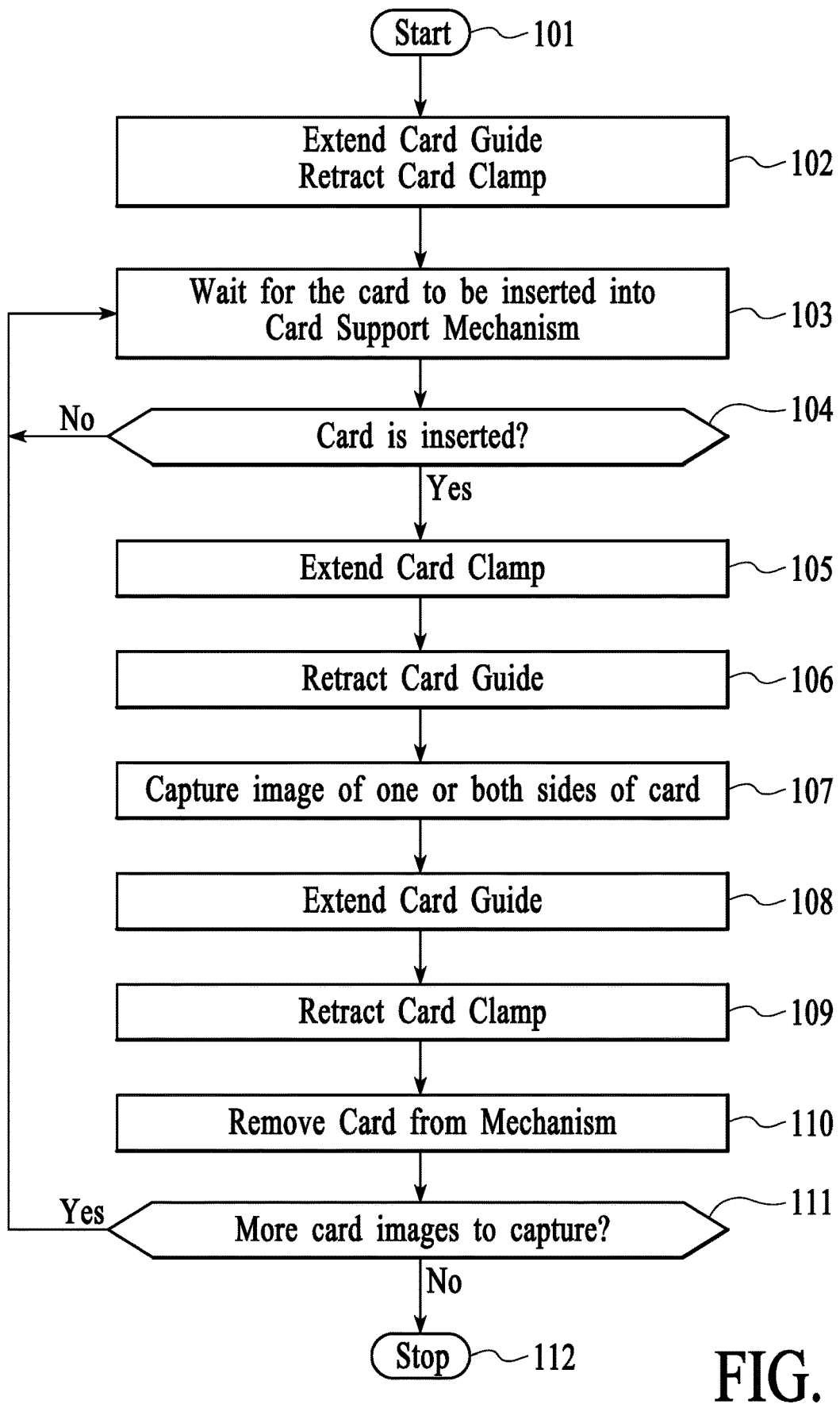
FIG. 10 is a flow chart that further illustrates operation of the card support mechanism shown in FIG. 6.

FIG. 10 is a flow chart that further illustrates operation of the card support mechanism shown in FIG. 6. After a start block 101, in a block 102 a card guide is extended and a card clamp is retracted. In a block 103, the card support mechanism waits for a card to be inserted. In a block 104, a check is made to monitor when a card is inserted.

When a card has been inserted, in a block 105, the card clamp is extended. In a block 106, the card guide is retracted. In a block 107 an image of one or both sides of the card is captured. In a block 108 the card guide is extended. In a block 109 the card clamp is retracted. In a block 110 the card is removed from the card support mechanism. In a block 111, a check is made to determine if more card images are to be captured. If so, in block 103, the card support mechanism waits for a card to be inserted. If no more card images are to be captured, in a block 103, the process is stopped.

Figure 11:
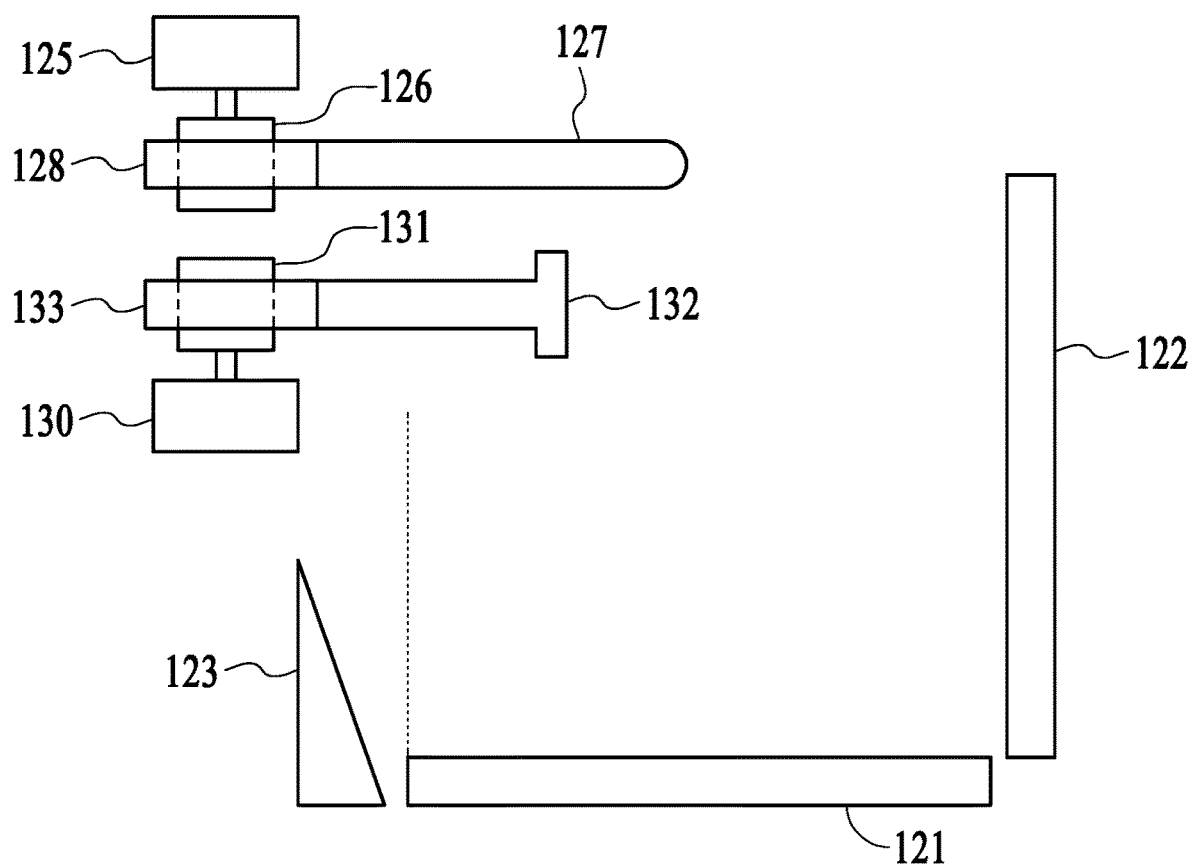
FIG. 11 shows motors used to implement a card support mechanism of a duplex card scanner.

FIG. 11 shows an example configuration of motors that can be used to implement a card support mechanism of a duplex card scanner. A motor 125 positions a card guide 127 via a pinion 126 of motor 125 in contact with a rack 128 of card guide 127. A motor 130 positions a card clamp 132 via a pinion 131 of motor 130 in contact with a rack 133 of card clamp 132. A card base guide 123 helps position a card that enters a card scanner. The card after entry rests on a card base 121. Card clamp 132 positions the card against a card stop 122.

Figure 12:
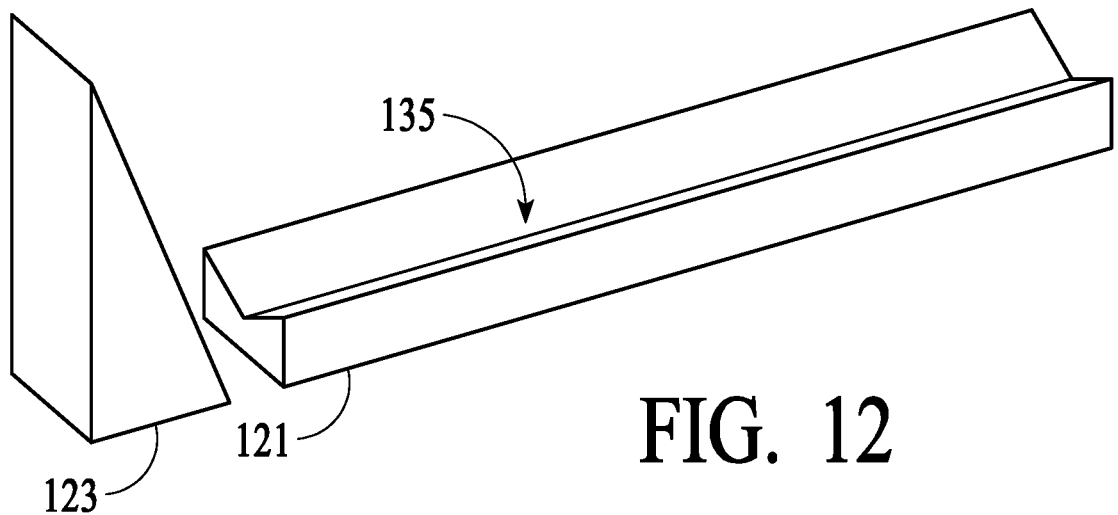
FIG. 12 shows additional detail of a card base and a card base guide used within the card support mechanism shown in FIG. 11.

FIG. 12 shows a simplified three-dimensional view of card base guide 123 and card base 121. Card base 121 is shown to have a groove 135 to receive and position a card.

Figure 13:
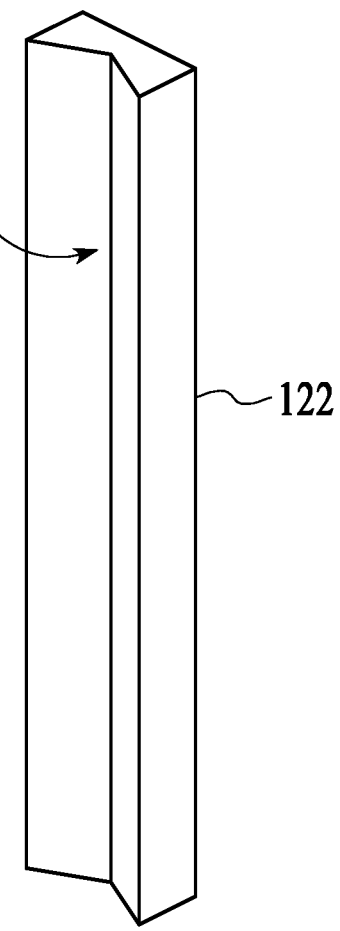
FIG. 13 shows additional detail of a card stop used within the card support mechanism shown in FIG. 11.

FIG. 13 shows a simplified three-dimensional view of card stop 122. Card stop 122 is shown to have a groove 136 to receive and position a card. The grove shape ensures that the card is optimally place in the center of card stop 122 for image capture. It also ensures that the card will not easily slip out of position when a slight pressure is applied by card clamp 132 to secure the card against the card stop 122.

Figure 14:
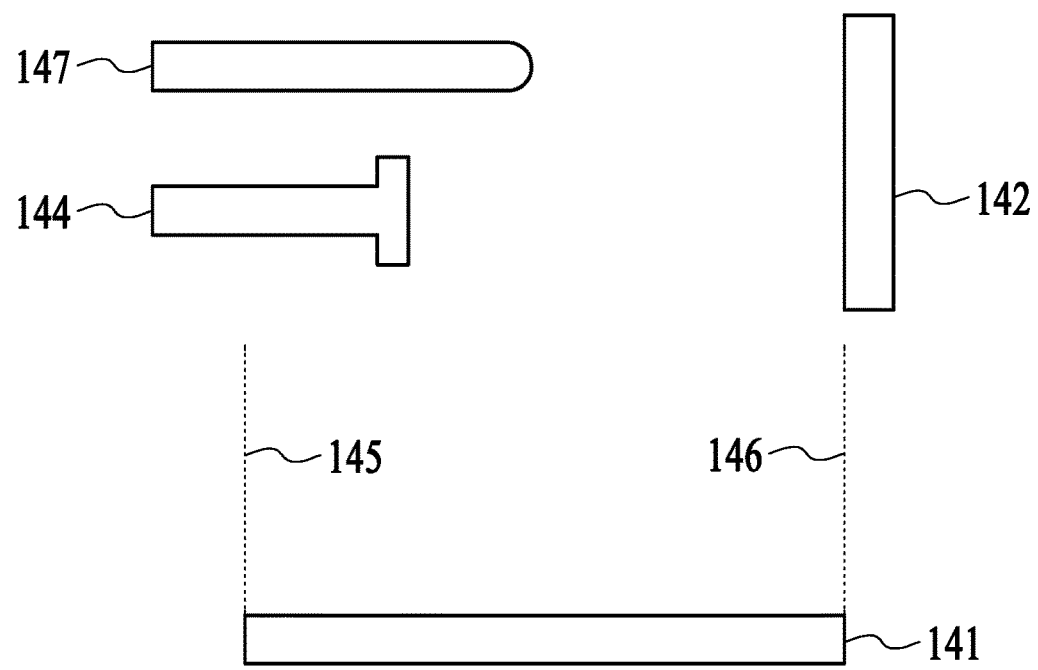
FIG. 14 illustrates an alternative embodiment of a card support mechanism of a duplex card scanner.

FIG. 14 illustrates an alternative embodiment of a card support mechanism of a duplex card scanner. A card guide 147 helps position a card that enters a card scanner. The card after entry rests on a card base 141. A card clamp 144 positions the card against a card stop 142. For example card base 141 and/or card stop 142 can be part of the housing of the duplex card scanner. A reference line 145 is shown to provide a reference for movement of positions card guide 147 and card clamp 144. Reference line 146 is also shown.

Figure 15:
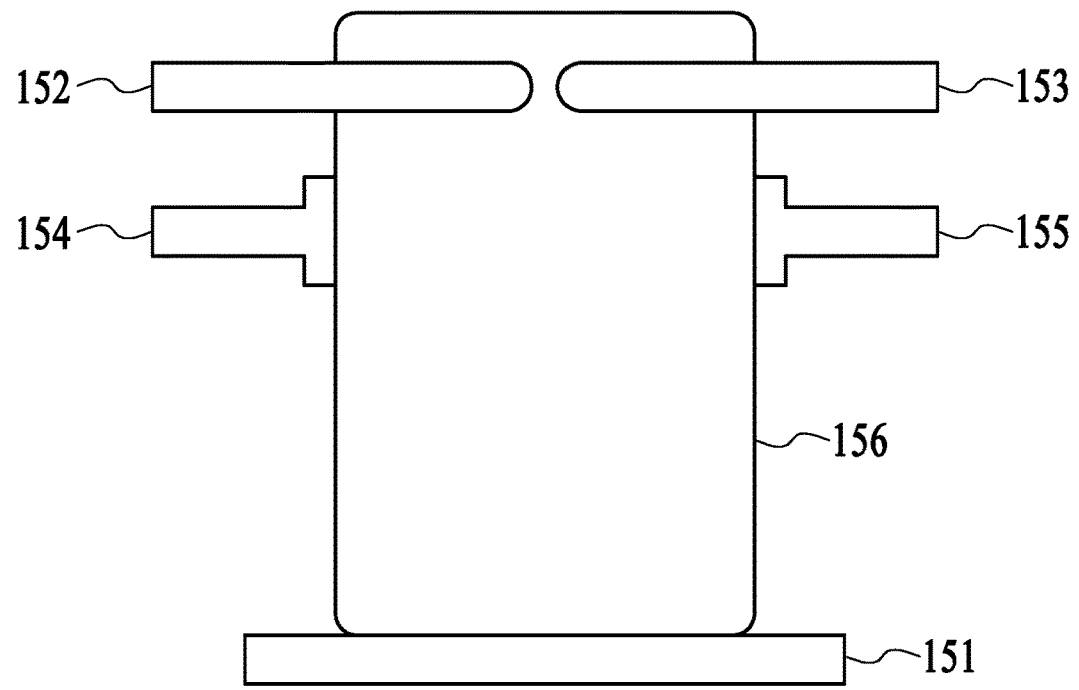
FIG. 15 illustrates another alternative embodiment of a card support mechanism of a duplex card scanner.

FIG. 15 illustrates another alternative embodiment of a card support mechanism of a duplex card scanner. A card guide 152 and a card guide 153 help position a card 156 that enters a card scanner. The card after entry rests on a card base 151. A card clamp 154 and a card clamp 155 position the card. After card clamp 154 and a card clamp 155 position the card, card guide 152 and card guide 153 move away from the card so that an unobstructed image can be made of both sides of the card.

Figure 16:
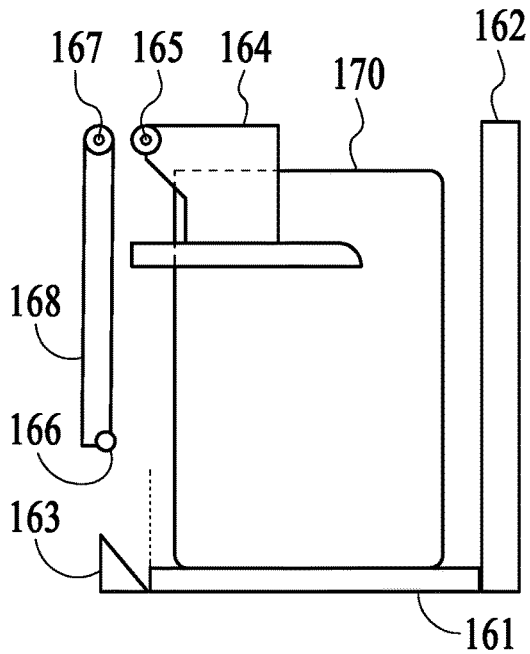
FIG. 16, FIG. 17, FIG. 18 and FIG. 19 illustrates operation of another alternative embodiment of a card support mechanism of a duplex card scanner.

FIG. 16 illustrates another alternative embodiment of a card support mechanism of a duplex card scanner. A swivel mount 165 is used to position a card guide 164. A swivel mount 167 positions a card clamp 166. A rod 168 connects swivel mount 167 to card clamp 166. A card base guide 163 helps position a card 170 that enters the card scanner. Card 170 after entry rests on a card base 161. Card clamp 166 positions card 170 against a card stop 162.

Figure 17:
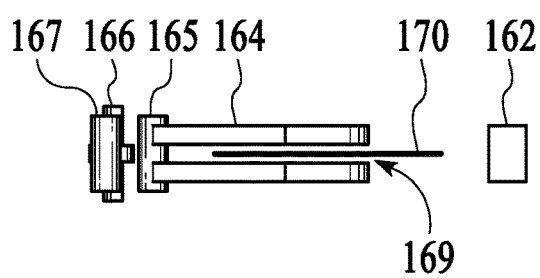

FIG. 17 shows a top view of card guide 164, card clamp 166, card 170 and card stop 162. A slot 169 in card guide 164 helps position card 170 as card 170 enters the duplex card scanner. Slot 169 is long enough so that as card clamp 166 swivels around swivel mount 167, rod 168 is able to enter slot 169.

Figure 18:
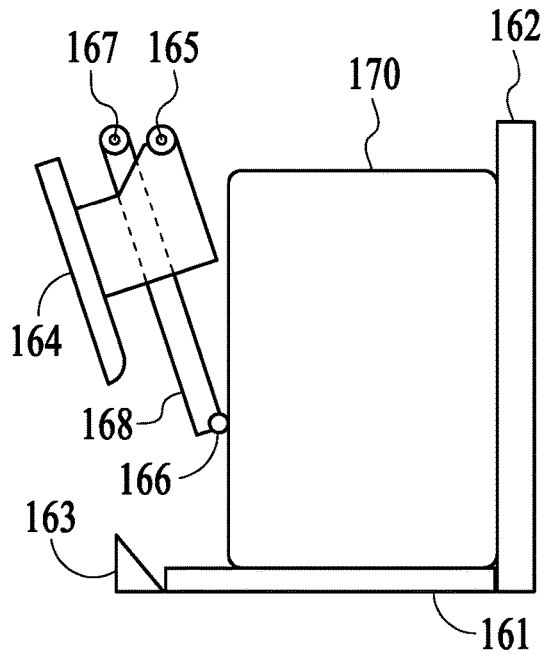

FIG. 18 shows card clamp 166 rotated around swivel mount so as to position card 170 against card stop 162. Card guide 164 has been rotated around swivel mount 165 so that an unobstructed image can be made of both sides of card 170.

Figure 19:
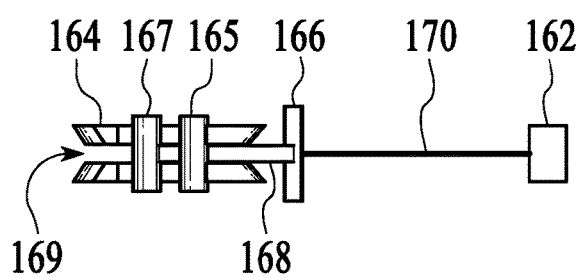

FIG. 19 shows a top view of card guide 164, card clamp 166, card 170 and card stop 162 in the rotation orientation shown in FIG. 18. In this position, rod 168 is within slot 169.

Figure 20:
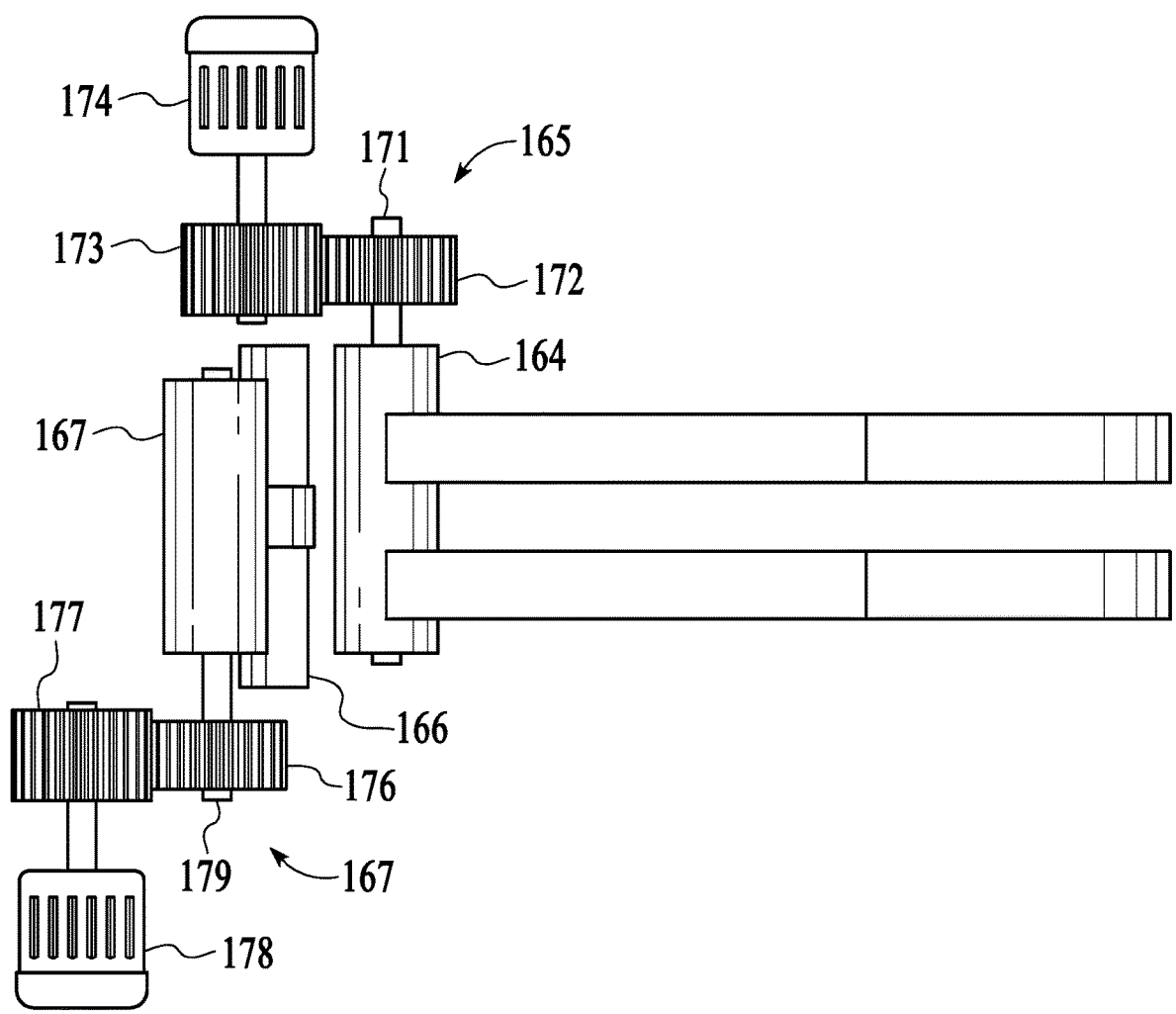
FIG. 20 illustrates an arrangement of motors that can be used to implement the card support mechanism shown in FIG. 16.

FIG. 20 shows an example configuration of motors that can be used to implement a card support mechanism of a duplex card scanner. A motor 174 controls swivel mount 165 via a pinion 173 of motor 174 in contact with a swivel pinion 172 around an axle 171 of swivel mount 165. A motor 178 controls swivel mount 167 via a pinion 177 of motor 178 in contact with a swivel pinion 176 around an axle 179 of swivel mount 167.

Figure 21:
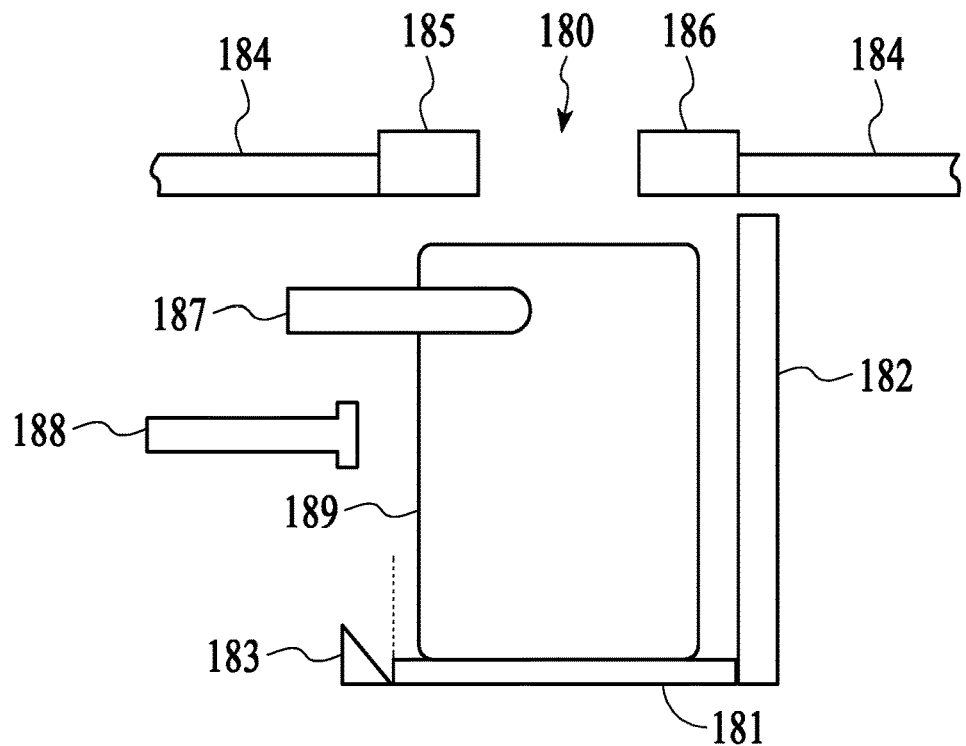
FIG. 21 and FIG. 22 illustrate housing configuration allowing manual extraction of cards from a duplex card scanner.
Figure 22:
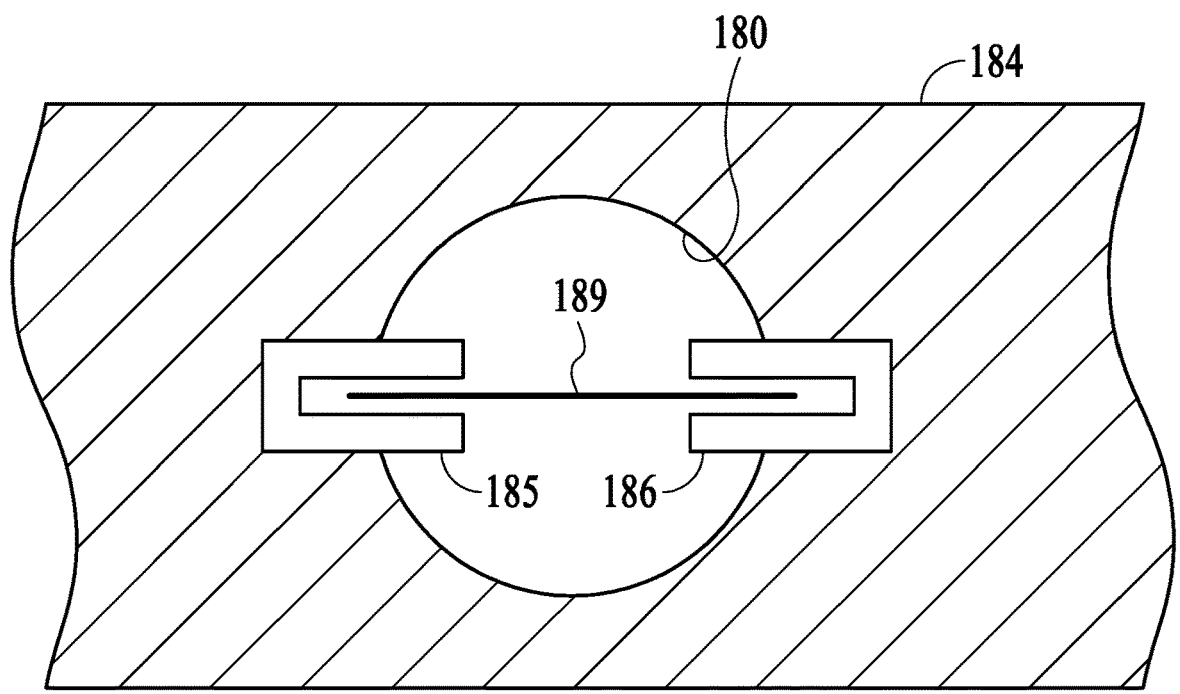

FIG. 21 and FIG. 22 illustrate housing configuration allowing manual extraction of cards from a duplex card scanner. A card guide 187 helps position a card 189 that enters a card scanner. A card base guide 183 helps position card 189 as it enters the card scanner. Card 189 after entry rests on a card base 181. A card clamp 188 positions card 189 against a card stop 182. For example card base 181 and/or card stop 182 can be part of the housing of the duplex card scanner.

Upper scanner housing 184 includes a left auxiliary card guide 185 and a right auxiliary card guide 186 that help guide card 189 into the card scanner. A cut out area 180 provides room for a thumb and forefinger to grasp card 189 and remove card 189 from the card scanner after card 189 has been scanned.

FIG. 22 is a top view that shows cut out area 180 being sized to allow room for a thumb and forefinger to grasp card 189 and remove card 189 from the card scanner.

Figure 23:
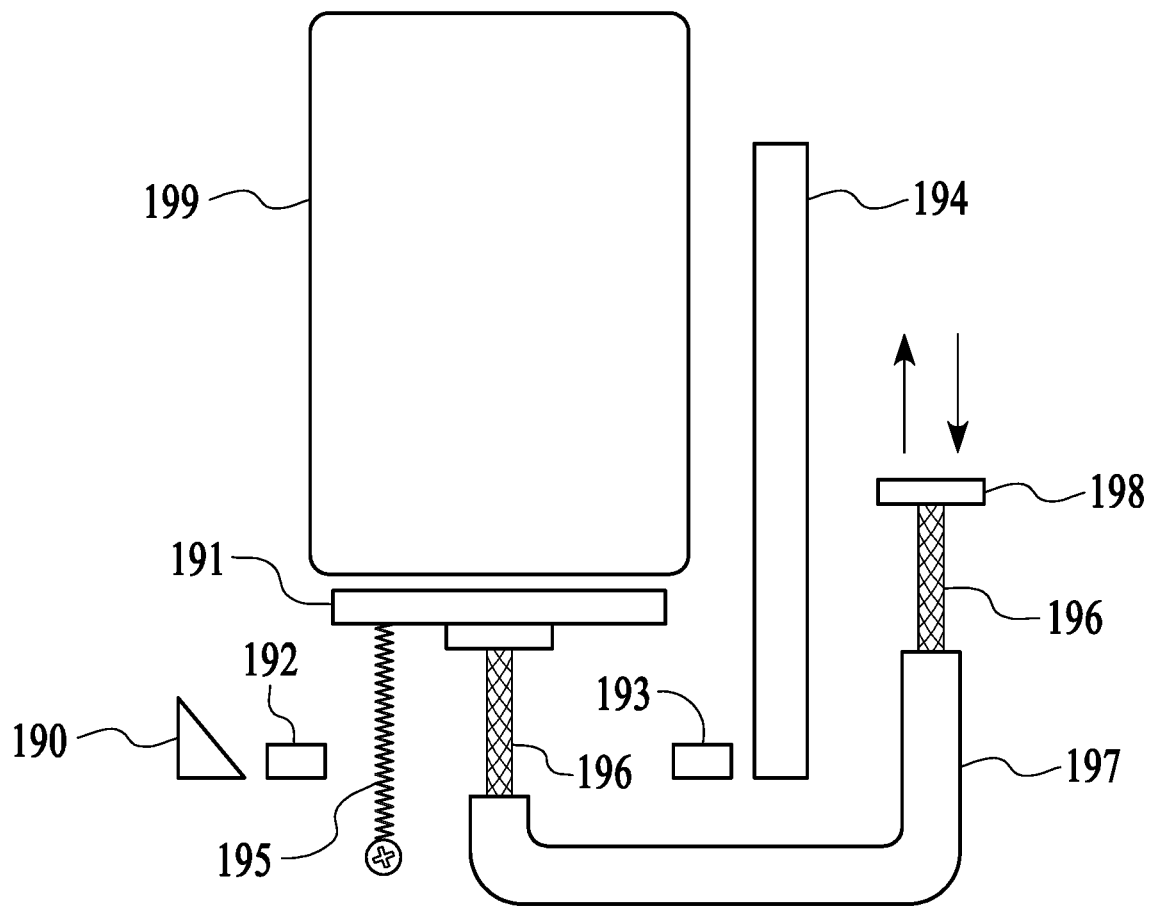
FIG. 23 illustrates an implementation of a movable card base within a duplex card scanner.

FIG. 23 illustrates housing configuration that uses a movable base section 191 to remove a card 199 from a duplex card scanner. A card base guide 190 helps position a card 199 that enters a card scanner. Card 199 after entry rests on card base section 191, a card base section 192 and a card base section 193. For example, a card stop 194 can be used for aligning card 199 for scanning.

When a user is ready to remove card 199 from the card scanner, the user can depress a lever 198 attached to a semi-rigid cable 196. Semi-rigid cable travels through a cable sleeve 197 that is anchored, for example to the card scanner housing. As the user presses lever 198, semi-rigid cable 196 pushes up on card base section 191 so that card base section pushes 191 the top portion of card 199 out of the card scanner so that the card can be easily grasped and removed from the card scanner. When the user releases pressure on lever 198 a spring 195 pulls card base section 191 back down to its position, ready for entry of a new card into the card scanner.

Figure 24:
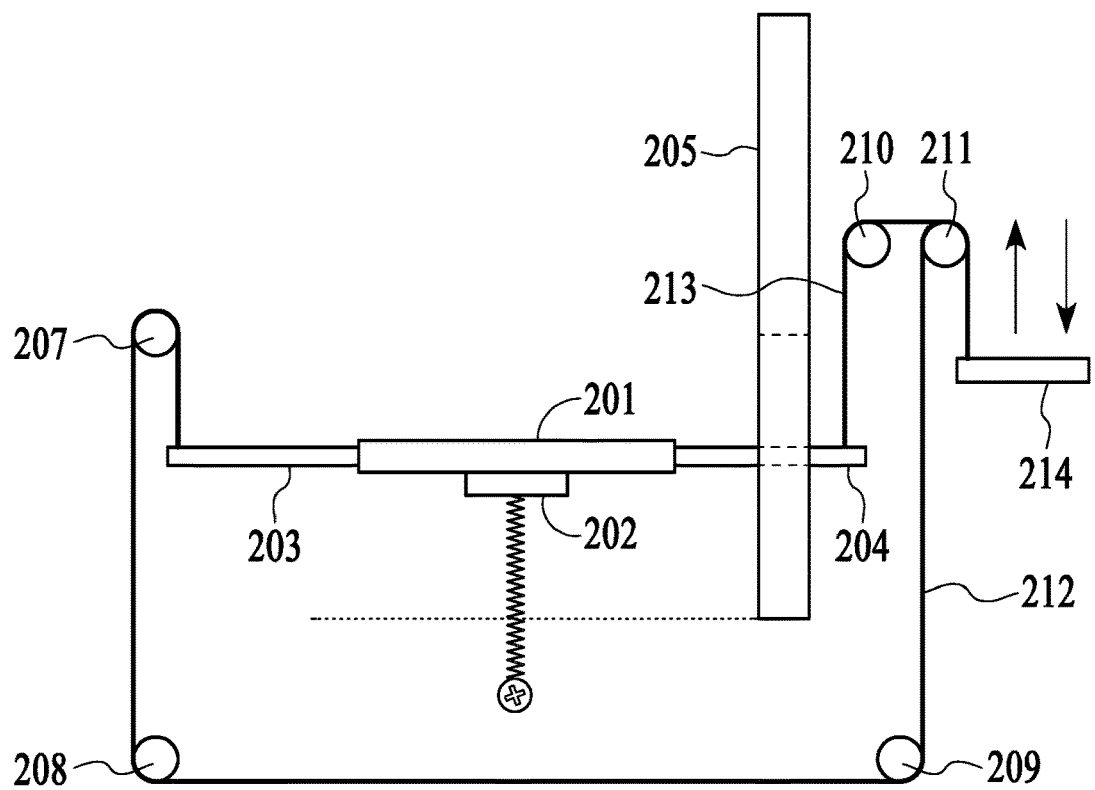
FIG. 24, FIG. 25 and FIG. 26 illustrate another implementation of a movable card base within a duplex card scanner.

FIG. 24 illustrates another housing configuration that uses a movable base section 201 to remove a card from a duplex card scanner. For example, a card stop 205 can be used for aligning the card.

When a user is ready to remove the card from the card scanner, the user can depress a lever 214 attached to a cable 212 and to a cable 213. Cable 213 travels over a pulley 211 and a pulley 210 to connect to a card extension base 204. Cable 212 travels over pulley 211 a pulley 209, a pulley 208 and a pulley 207 to connect to a card base extension 203. As the user presses lever 214, cable 212 pulls up on card base extension 203 and cable 213 pulls up on card base extension 204. This raises up card base section 201 so that card base section pushes the top portion of the card out of the card scanner so that the card can be easily grasped and removed from the card scanner. When the user releases pressure on lever 214 a spring 202 pulls card base section 201 back down to its position, ready for entry of a new card into the card scanner.

Figure 25:
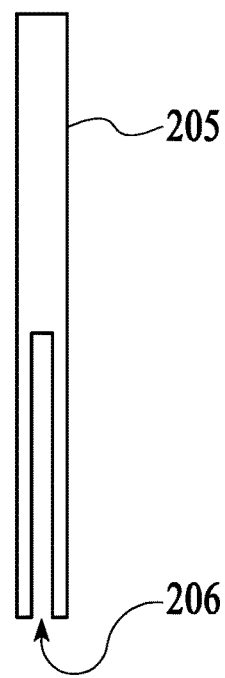

FIG. 25 shows a side view of card stop 205 that makes visible a cut-out slot 206. Cut out slot 206 is sized so that card base extension 204 can freely move up and down without being obstructed by card stop 205.

Figure 26:
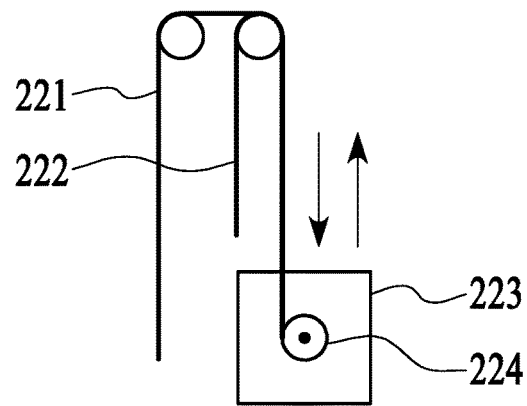

FIG. 26 shows how a motor 223 with a cable reel 224 can connect to a cable 221 and a cable 222 to replace manual lever 214 shown in FIG. 24.

Figure 27:
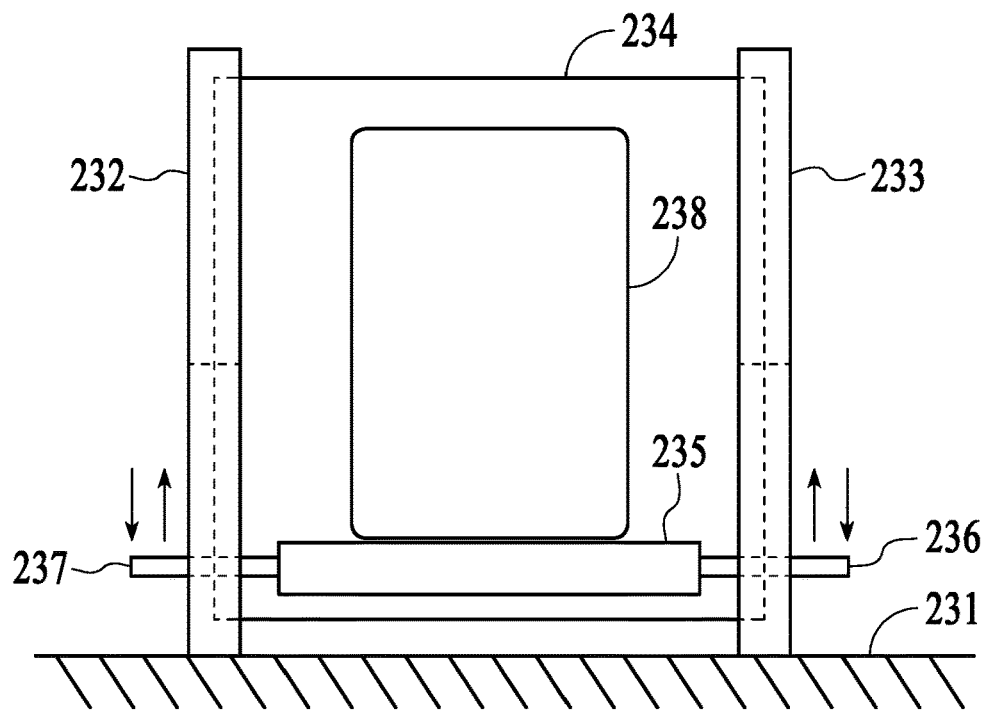
FIG. 27 and FIG. 28 illustrate another implementation of a movable card base within a duplex card scanner.
Figure 28:
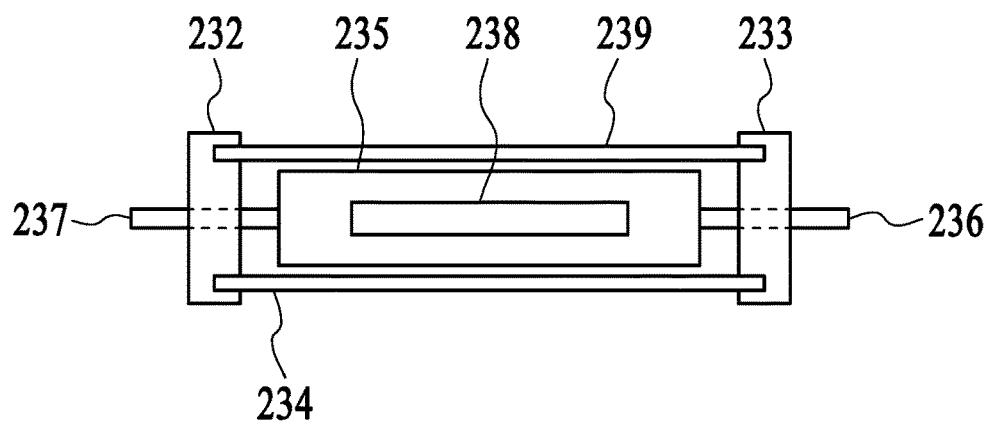

FIG. 27 and FIG. 28 illustrate another housing configuration that uses a movable base section 235 to remove a card 238 from a duplex card scanner. A glass pillar support 233 and a glass pillar support 232 support a sheet of antireflective glass 234 and a sheet of antireflective glass 239. A base extender 237 and a base extender 236 are connected to card base 235. When a user is ready to remove card 238 from the card scanner, base extender 236 and base extender 237 are used to raise card base section 235 so that the top portion of card 238 is pushed out of the card scanner so that card 238 can be easily grasped and removed from the card scanner.

FIG. 28 shows a top view where the relative position of sheet of antireflective glass 234, sheet of antireflective glass 239, card 238 and card base section 235 can be better ascertained. A slot within glass pillar support 232 allows card base extender 237 to freely move up and down.

Likewise, a slot within glass pillar support 233 allows card base extender 236 to freely move up and down.

For example, space between card base section 235 and sheet of antireflective glass 239 and space between card base section 235 and sheet of antireflective glass 234 is kept to a minimum to avoid card 238 from slipping off card base section 235 as card base section 235 is moved between sheet of antireflective glass 239 and sheet of antireflective glass 234.

For example, sheet of antireflective glass 239 and sheet of antireflective glass 234 are composed of anti-reflective coated glass. Alternatively, another transparent material such has clear glass or plexiglass can be used.

In an alternative embodiment, glass pillar support 233 and glass pillar support 232 support are omitted so that sheet of antireflective glass 234 and sheet of antireflective glass 239 are supported instead by the scanner housing.

This dual antireflective glass embodiment is suitable for two-sided image capture of a card. A simplified version of this embodiment can be implemented with only one sheet of antireflective glass to capture an image from a single side of the card. In this embodiment, for example, one sheet of antireflective glass and one sheet of a solid opaque panel or vertical support bars can be used.

Antireflective glass sheets can be used to enhance other embodiments. For example, the embodiment shown in FIG. 23 can be modified to use sheets of antireflective glass by removing card stop 194, and using glass pillar supports and sheets of antireflective glass as in the embodiment shown in FIG. 27 and FIG. 28. Likewise, the embodiment shown in FIG. 24 can be modified to use sheets of antireflective glass by removing card stop 205, and using glass pillar supports and sheets of antireflective glass as in the embodiment shown in FIG. 27 and FIG. 28. Alternatively, the glass pillar supports can be omitted and the sheets of antireflective glass can be supported by scanner housing.

Figure 29:
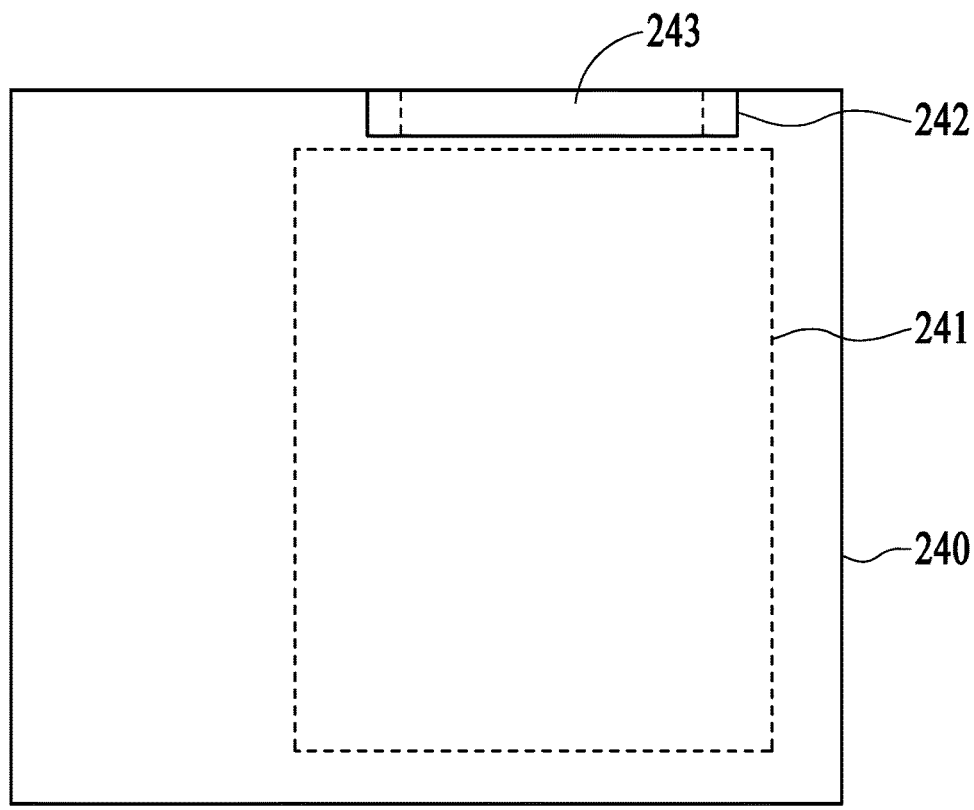
FIG. 29 and FIG. 30 illustrate use of a card input slot and an auxiliary card guide within a duplex card scanner.
Figure 30:
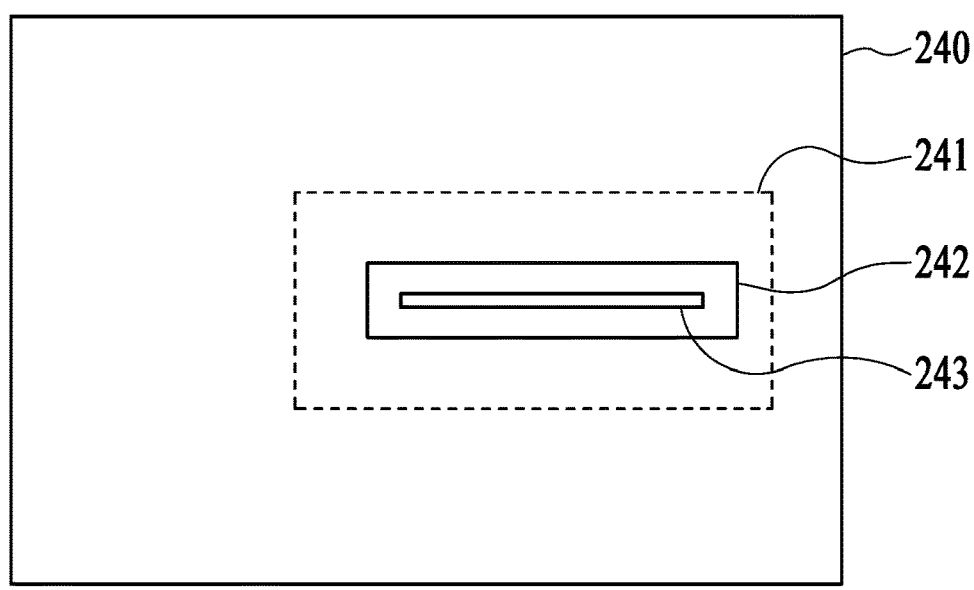

FIG. 29 shows a side view and FIG. 30 shows a top view of scanner housing 240 having an auxiliary card guide 242 and a card input slot 243. Dashed lines 241 outlines a card support mechanism.

Figure 31:
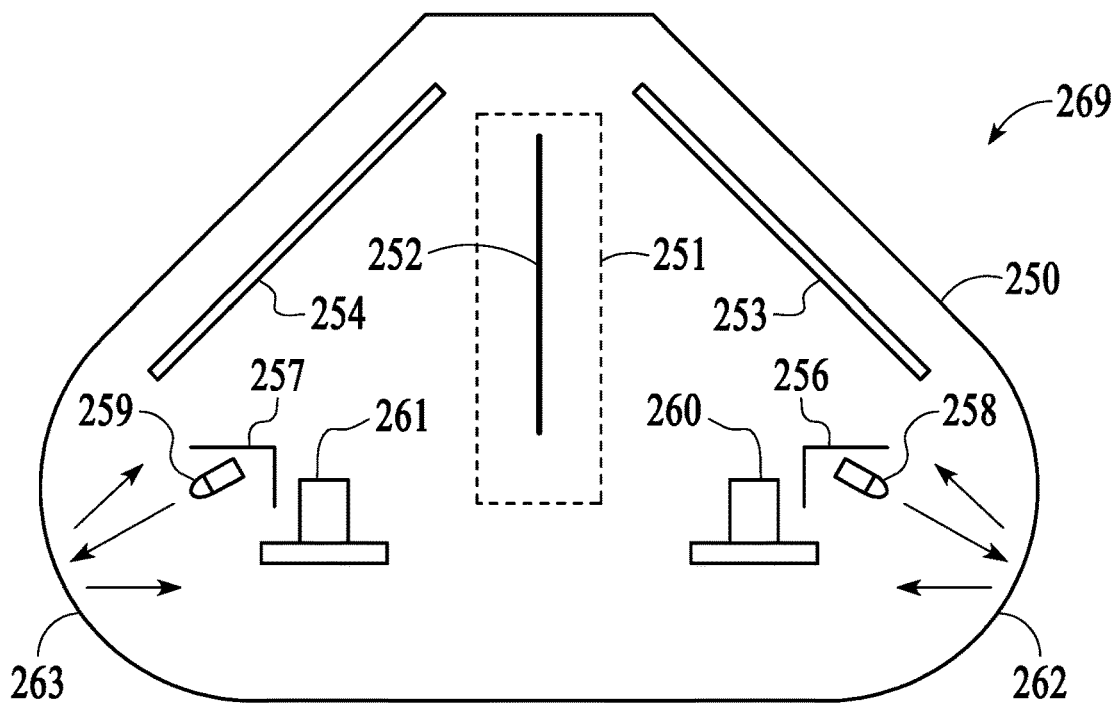
FIG. 31 shows a lighting configuration for a duplex card scanner that has two cameras.

FIG. 31 shows a simplified top view of a duplex card scanner 269 that uses a camera 260 and a camera 261. A card 252 is positioned between a mirror 253 and a mirror 254 oriented as shown. Camera 260 captures an image that includes a first side of card 252. Camera 261 captures an image that includes a second side of card 252. A card support mechanism is represented by dashed lines 251. Illumination is provided by an LED 258 and an LED 259. A light shield 256 protects against direct light from LED 258 reaching mirror 253 or card 252. A light shield 257 protects against direct light from LED 259 reaching mirror 254 or card 252. Arrows 262 represent light emitted from LED 258 being reflected by a light colored matte inner surface of housing 250. Arrows 263 represent light emitted from LED 259 being reflected by a light colored matte inner surface of housing 250.

Figure 32:
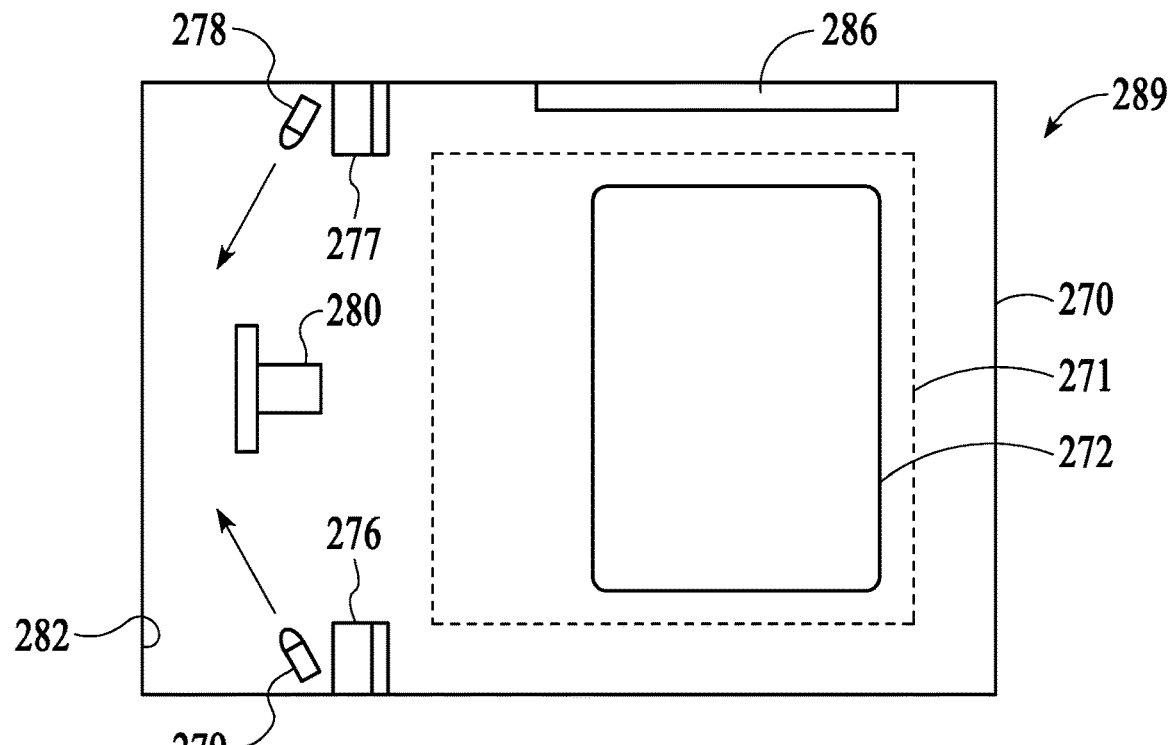
FIG. 32 shows a lighting configuration for a duplex card scanner that has a single camera.

FIG. 32 shows a simplified side view of a card scanner 289 that uses a camera 280. For a duplex card scanner a second camera may be used. A card support mechanism supports a card 272 entering card scanner 289 through an auxiliary card guide 286. Illumination is provided by an LED 278 and an LED 279. A light shield 276 protects against direct light from LED 279 reaching card 271. A light shield 277 protects against direct light from LED 278 reaching card 271. Light emitted from LED 278 is reflected by a light colored matte inner surface of housing 270.

Likewise, light emitted from LED 279 is reflected by the light colored matte inner surface of housing 270.

Figure 33:
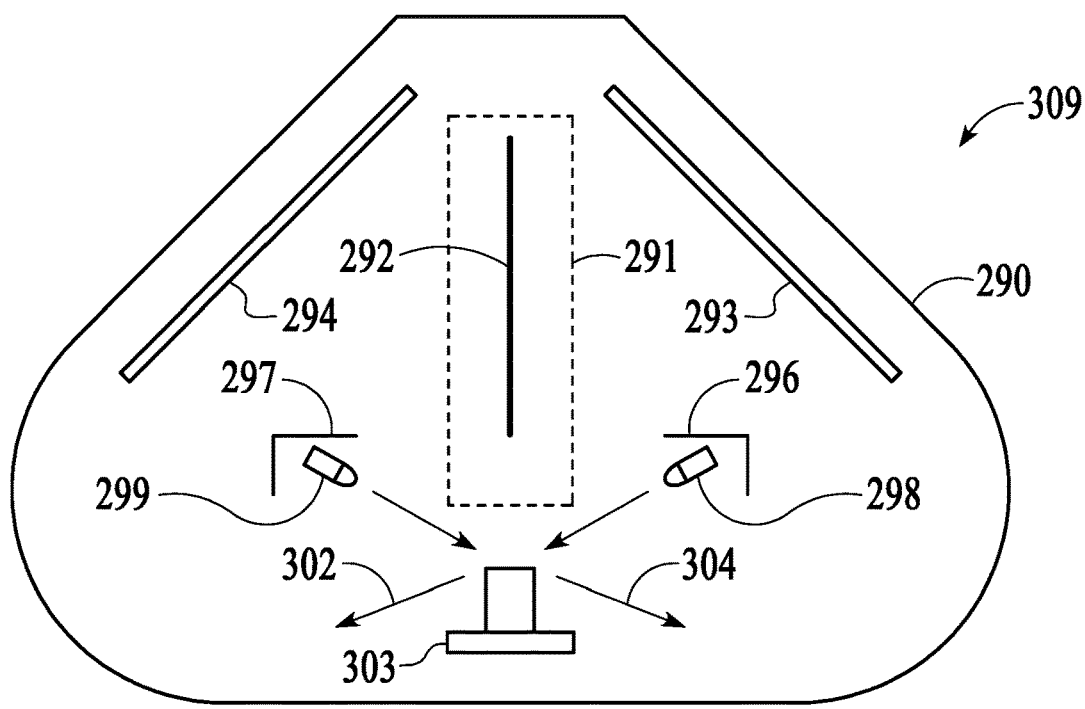
FIG. 33 shows another lighting configuration for a duplex card scanner that has a single camera.

FIG. 33 shows a simplified top view of a duplex card scanner 309 that uses a camera 303. A card 292 is positioned between a mirror 293 and a mirror 294 oriented as shown. Camera 303 captures an image that includes both sides of card 292. A card support mechanism is represented by dashed lines 291. Illumination is provided by an LED 298 and an LED 299. A light shield 296 protects against direct light from LED 298 reaching mirror 293 or card 292. A light shield 297 protects against direct light from LED 299 reaching mirror 294 or card 292. Arrows 304 represent light emitted from LED 298 being reflected by a light colored matte inner surface of housing 290. Arrows 303 represent light emitted from LED 299 being reflected by a light colored matte inner surface of scanner housing 290.

Figure 34:
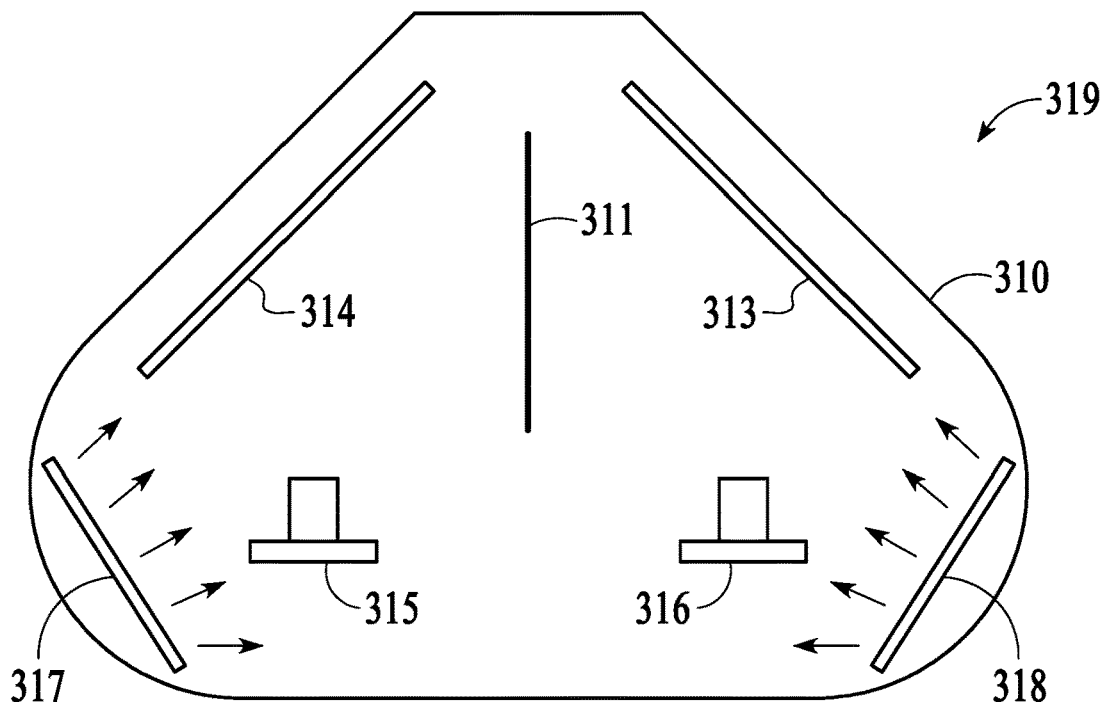
FIG. 34 shows another lighting configuration for a duplex card scanner that has two cameras.

FIG. 34 shows a simplified top view of a duplex card scanner 319 that uses a camera 315 and a camera 316. A card 311 is positioned between a mirror 313 and a mirror 314 oriented as shown. Camera 315 captures an image that includes a first side of card 311. Camera 316 captures an image that includes a second side of card 311. Illumination is provided by a diffused light panel 317 and a diffused light panel 318 as shown.

Figure 35:
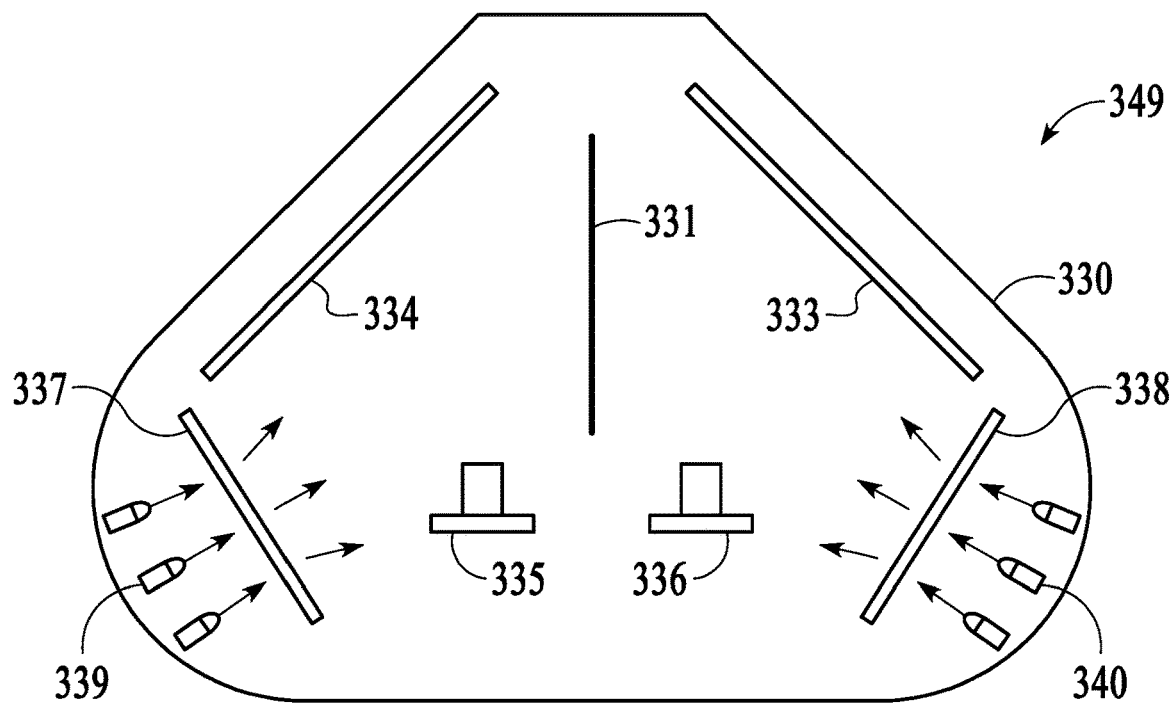
FIG. 35 shows another lighting configuration for a duplex card scanner that has a single camera.

FIG. 35 shows a simplified top view of a duplex card scanner 349 that uses a camera 335 and a camera 336. A card 331 is positioned between a mirror 333 and a mirror 334 oriented as shown. Camera 335 captures an image that includes a first side of card 331. Camera 336 captures an image that includes a second side of card 331. Illumination is provided by LEDs 339 and LEDs 340. A light diffuser panel 337 diffuses light from LEDs 339. A light diffuser panel 338 diffuses light from LEDs 340.

Figure 36:
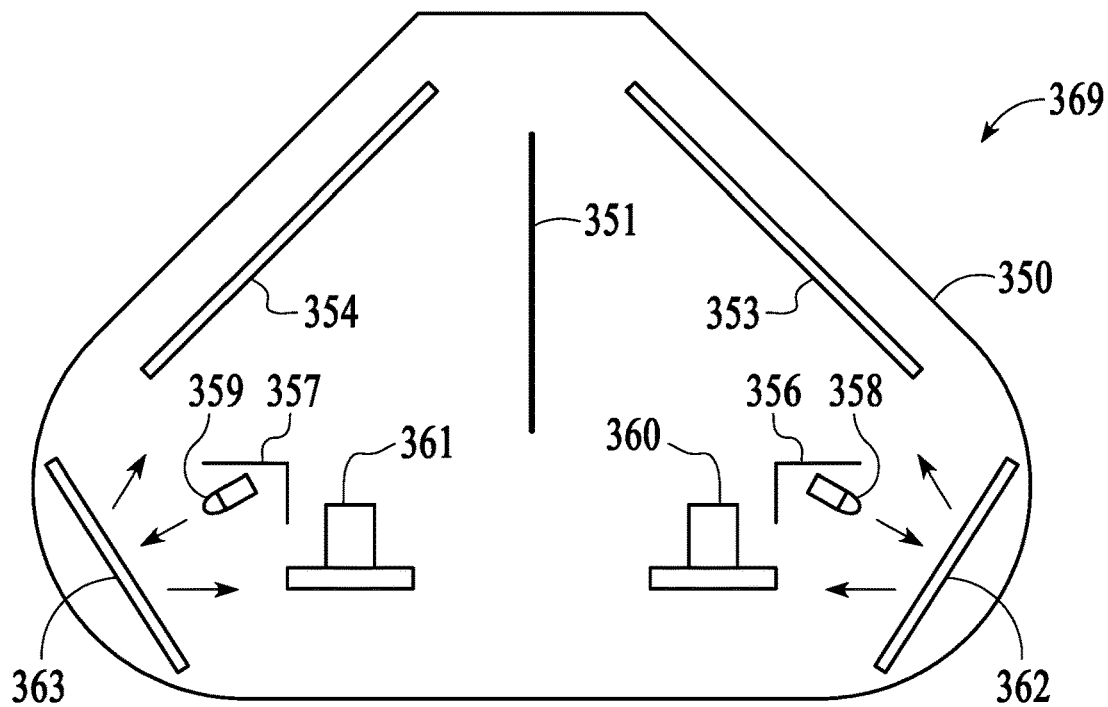
FIG. 36 shows another lighting configuration for a duplex card scanner that has two cameras.

FIG. 36 shows a simplified top view of a duplex card scanner 369 that uses a camera 360 and a camera 361. A card 351 is positioned between a mirror 353 and a mirror 354 oriented as shown. Camera 360 captures an image that includes a first side of card 351. Camera 361 captures an image that includes a second side of card 351. Illumination is provided an LED 359 and an LED 358. A light shield 357 protects against direct light from LED 359 reaching mirror 354 or card 351. A light shield 356 protects against direct light from LED 358 reaching mirror 353 or card 351. A reflective light diffuser panel 362 reflects and diffuses light from LEDs 358. A reflective light diffuser panel 363 reflects and diffuses light from LEDs 359.

Figure 37:
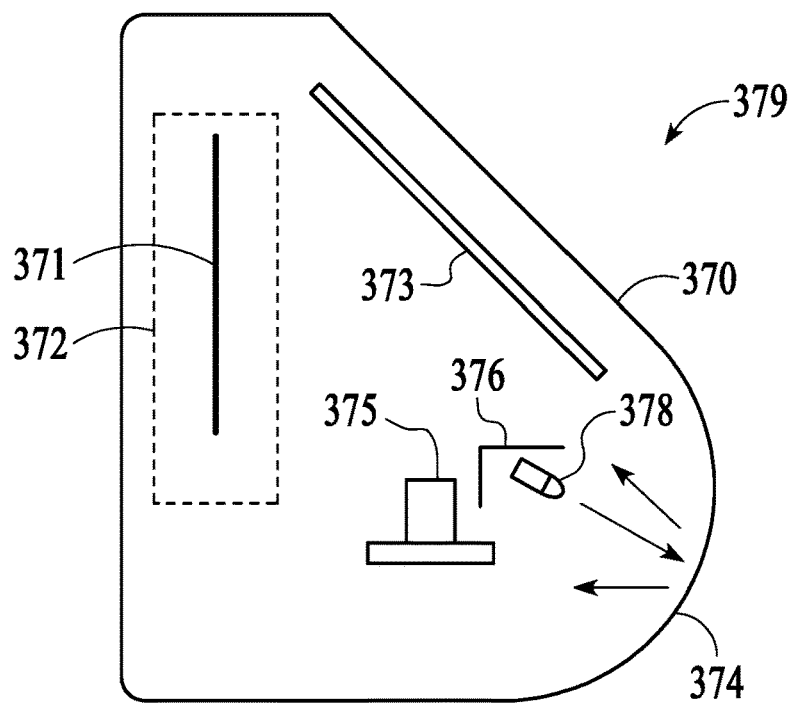
FIG. 37 shows a lighting configuration for a simplex card scanner.

FIG. 37 shows a simplified top view of a simplex card scanner 379 that uses a camera 375. A card 371 is positioned adjacent to a mirror 373 oriented as shown. Camera 375 captures an image that includes a first side of card 371. Camera 375 captures an image of one side of card 371. A card support mechanism is represented by dashed lines 372. Illumination is provided by an LED 378. A light shield 376 protects against direct light from LED 378 reaching mirror 373 or card 371. Arrows 374 represent light emitted from LED 378 being reflected by a light colored matte inner surface of scanner housing 370.

Figure 38:
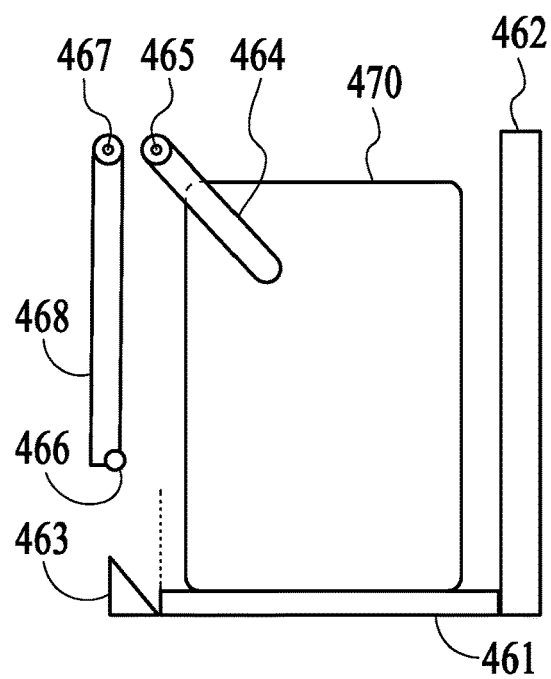
FIG. 38 illustrates another alternative embodiment of a card support mechanism of a duplex card scanner.

FIG. 38 illustrates another alternative embodiment of a card support mechanism of a duplex card scanner. A swivel mount 465 is used to position a card guide 464. A swivel mount 467 positions a card clamp 466. A rod 468 connects swivel mount 467 to card clamp 466. A card base guide 463 helps position a card 470 that enters the card scanner. Card 470 after entry rests on a card base 461. Card clamp 466 positions card 470 against a card stop 462.

Figure 39:
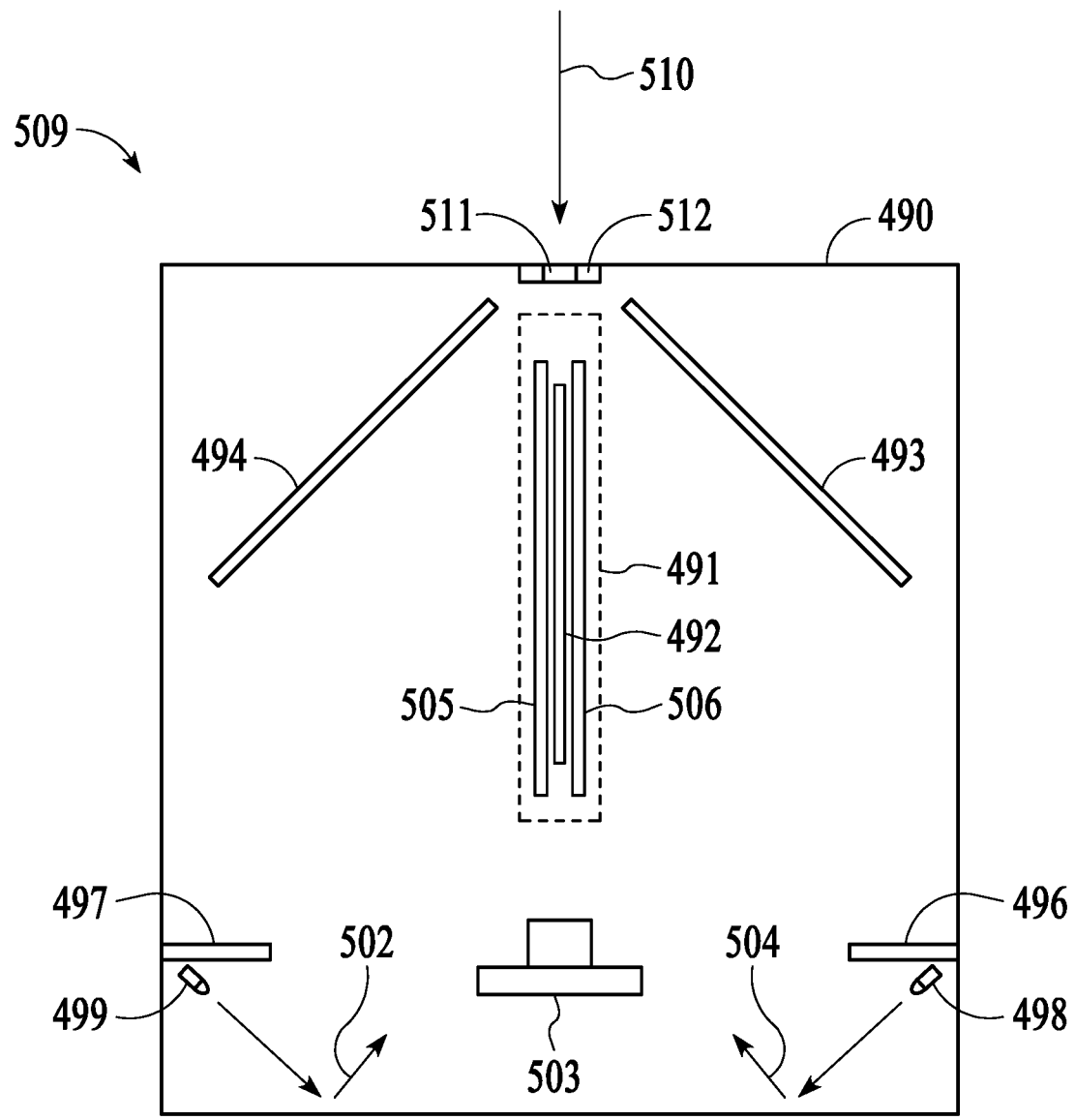
FIG. 39 and FIG. 40 show another lighting configuration for a duplex card scanner that has a single camera.
Figure 40:
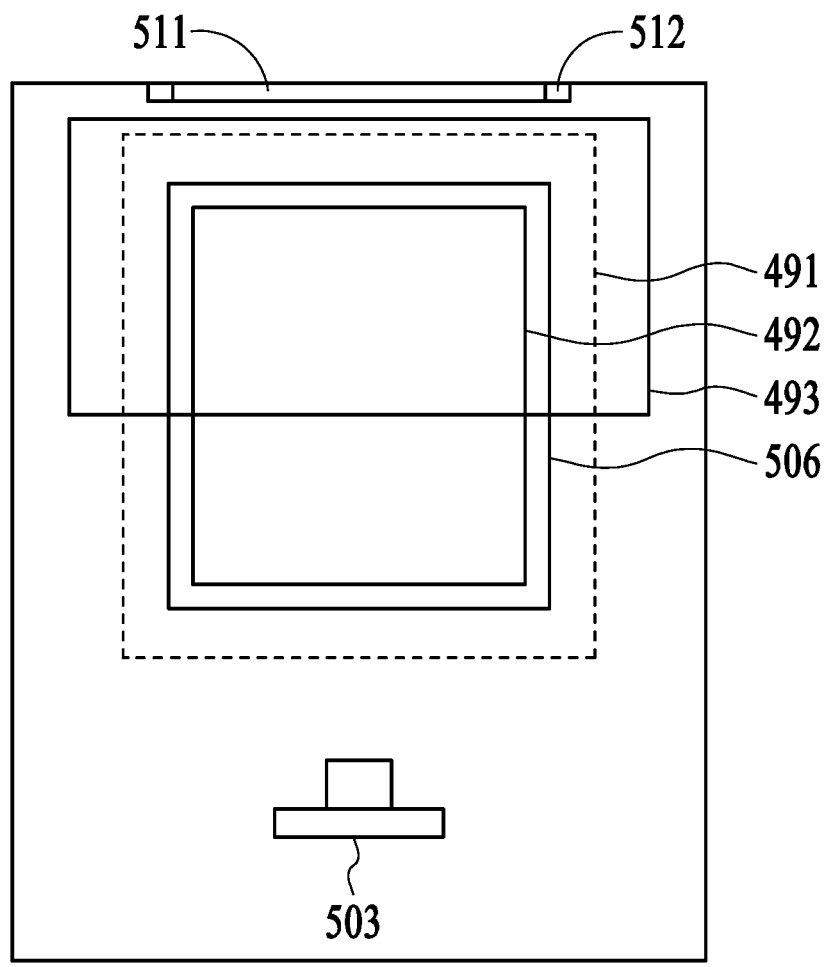

FIG. 39 shows a simplified front view and FIG. 40 shows a simplified side view of a duplex card scanner 509 that uses a camera 503. A card 492 is positioned between a mirror 493 and a mirror 494 oriented as shown. Camera 503 captures an image that includes both sides of card 492. A card support mechanism is represented by dashed lines 491 and includes anti-reflective glass 505 and anti-reflective glass 506 configured as shown. A card input 510 includes a card input slot 511 and an auxiliary card guide 512. Illumination is provided by an LED 498 and an LED 499. A light shield 496 protects against direct light from LED 498 reaching mirror 493 or card 492. A light shield 497 protects against direct light from LED 499 reaching mirror 494 or card 492. Arrows 504 represent light emitted from LED 498 being reflected by a light colored matte inner surface of housing 490. Arrows 502 represent light emitted from LED 499 being reflected by a light colored matte inner surface of scanner housing 490. To increase clarity, the side view shown in FIG. 40 does not include LED lights and light shields, etc.

The configuration shown in FIG. 38 and FIG. 39, can be varied, for example my replacing camera 503 with a two camera system similar to the use of two cameras as described in the discussion of FIG. 4 above. Additionally, alternative methods of providing indirect light can be used, including, for example the use of LED lights with transmissive or reflective diffusers or for example the use of diffused light panels. Such methods of providing indirect light are described, for example, in the discussion of FIG. 31 through FIG. 37, above While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A card scanner, comprising:
   card support mechanism for receiving a card;
   a camera system;
   a first mirror mounted so that a first image of a first side of the card reflects to the camera system when the card is within the card support mechanism; and
   a second mirror mounted so that a second image of a second side of the card reflects to the camera system when the card is within the card support mechanism;
   wherein once the card is within the scanner, the camera system captures the first image of the first side of the card and the second image of the second side of the card; and
   wherein the card support mechanism comprises:
      a card guide that helps to position the card as the card is placed within the scanner,
      a card base on which the card rests when the card is within the card support mechanism,
      a card stop, and
      a card clamp that moves the card against the card stop when the card is within the card support mechanism.

2. The card scanner of claim 1 wherein:
   the card guide is withdrawn from covering any portion of the first side of the card and any portion of the second side of the card before the camera system captures the first image of the first side of the card and the second image of the second side of the card.

3. The card scanner of claim 2:
wherein a first motor controls movement of the card clamp; and
wherein a second motor controls movement of the card guide.

4. The card scanner of claim 1, additionally comprising:
a scanner housing including a cut out region of sufficient size to allow the card to be removed from the card scanner by a user reaching into the scanner with a forefinger and thumb.

5. The card scanner of claim 1 additionally comprising:
diffused light panels;
wherein when the camera system captures the first image of the first side of the card and the second image of the second side of the card, the first side of the card and the second side of the card are illuminated by light from the diffused light panels.

6. The card scanner of claim 1 additionally comprising:
a plurality of light emitting diodes (LEDs); and
light diffuser panels;
wherein when the camera system captures the first image of the first side of the card and the second image of the second side of the card, the first side of the card and the second side of the card are illuminated by light from the plurality of light emitting diodes (LEDs) that has been diffused by the light diffuser panels.

7. The card scanner of claim 1 additionally comprising:
a plurality of light emitting diodes (LEDs); and
reflective light diffuser panels;
wherein when the camera system captures the first image of the first side of the card and the second image of the second side of the card, the first side of the card and the second side of the card are illuminated by light from the plurality of light emitting diodes (LEDs) that has been reflected and diffused by the reflective light diffuser panels.

8. The card scanner of claim 1, wherein the camera system comprises only a single camera positioned to simultaneously capture the first image of the first side of the card and the second image of the second side of the card.

9. The card scanner of claim 1, wherein the camera system comprises a first camera and a second camera, the first camera positioned to capture the first image of the first side of the card and the second camera positioned to capture the second image of the second side of the card.

10. A card scanner, comprising:
card support mechanism for receiving a card;
a camera system;
a first mirror mounted so that a first image of a first side of the card reflects to the camera system when the card is within the card support mechanism; and
a second mirror mounted so that a second image of a second side of the card reflects to the camera system when the card is within the card support mechanism;
wherein once the card is within the scanner, the camera system captures the first image of the first side of the card and the second image of the second side of the card; and
wherein the card support mechanism comprises:
a first card guide that helps to position the card as the card is placed within the scanner,
a second card guide that helps to position the card as the card is placed within the scanner,
a card base on which the card rests when the card is within the card support mechanism, and
a first card clamp and a second card clamp that clamp the card when the card is within the card support mechanism.

11. A card scanner, comprising:
card support mechanism for receiving a card;
a camera system;
a first mirror mounted so that a first image of a first side of the card reflects to the camera system when the card is within the card support mechanism; and
a second mirror mounted so that a second image of a second side of the card reflects to the camera system when the card is within the card support mechanism;
wherein once the card is within the scanner, the camera system captures the first image of the first side of the card and the second image of the second side of the card; and
wherein the card support mechanism comprises:
a card guide that helps to position the card as the card is placed within the scanner,
a card base on which the card rests when the card is within the card support mechanism, and
a first card clamp and a second card clamp that clamp the card when the card is within the card support mechanism,
wherein the card guide is withdrawn from covering any portion of the first side of the card and any portion of the second side of the card before the camera system captures the first image of the first side of the card and the second image of the second side of the card.

12. A card scanner, comprising:
a card support mechanism for receiving a card;
a camera system;
a first mirror mounted so that a first image of a first side of the card reflects to the camera system when the card is within the card support mechanism;
a second mirror mounted so that a second image of a second side of the card reflects to the camera system when the card is within the card support mechanism;
a card base on which the card rests when the card is within the card support mechanism; and
a card removal mechanism, the card removal mechanism moving at least a portion of the card base to push the card at least part way out of the card scanner;
wherein once the card is within the scanner, the camera system captures the first image of the first side of the card and the second image of the second side of the card.

13. The card scanner of claim 12,
wherein the card removal mechanism includes a lever connected to a semi-rigid cable that travels through a cable sleeve.

14. The card scanner of claim 12,
wherein the card base includes a lever connected to a pulley and cable system.

15. A card scanner, comprising:
a card support mechanism for receiving a card;
a camera system;
a first mirror mounted so that a first image of a first side of the card reflects to the camera system when the card is within the card support mechanism;
a second mirror mounted so that a second image of a second side of the card reflects to the camera system when the card is within the card support mechanism;

a first glass support pillar;

a second glass support pillar;

a first sheet of non-reflective glass mounted between the first glass support pillar and the second glass support pillar; and a second sheet of non-reflective glass mounted between the first glass support pillar and the second glass support pillar;

wherein once the card is within the scanner, the camera system captures the first image of the first side of the card and the second image of the second side of the card; and wherein when the card is within the card support mechanism, the card is placed between the first sheet of non-reflective glass and the second sheet of non-reflective glass.

16. A card scanner, comprising:

a card support mechanism for receiving a card;

a camera system;

a first mirror mounted so that a first image of a first side of the card reflects to the camera system when the card is within the card support mechanism;

a second mirror mounted so that a second image of a second side of the card reflects to the camera system when the card is within the card support mechanism;

a scanner housing, having light colored matting interior surface portions; and light emitting diodes (LEDs);

wherein once the card is within the scanner, the camera system captures the first image of the first side of the card and the second image of the second side of the card; and wherein when the camera system captures the first image of the first side of the card and the second image of the second side of the card, the first side of the card and the second side of the card are illuminated by light from the LEDs reflecting off the light colored matting interior surface portions of the scanner housing.

17. A card scanner, comprising:

a card support mechanism for receiving a card;

a camera system;

a first mirror mounted so that a first image of a first side of the card reflects to the camera system when the card is within the card support mechanism;

a second mirror mounted so that a second image of a second side of the card reflects to the camera system when the card is within the card support mechanism;

a first sheet of non-reflective glass mounted; and a second sheet of non-reflective glass mounted;

wherein once the card is within the scanner, the camera system captures the first image of the first side of the card and the second image of the second side of the card; and wherein when the card is within the card support mechanism, the card is placed between the first sheet of non-reflective glass and the second sheet of non-reflective glass.

* * * * *